(12) United States Patent
Fukuda et al.

(10) Patent No.: US 10,137,367 B2
(45) Date of Patent: Nov. 27, 2018

(54) CAPTURE NOTIFICATION SYSTEM, CAPTURE NOTIFICATION METHOD, PROGRAM, INFORMATION STORAGE MEDIUM, AND INFORMATION PROCESSING DEVICE

(71) Applicant: Sony Interactive Entertainment Inc., Tokyo (JP)

(72) Inventors: Shizuto Fukuda, Chiba (JP); Shinji Aizawa, Tokyo (JP); Hisao Wada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 24 days.

(21) Appl. No.: 15/102,702

(22) PCT Filed: Dec. 17, 2014

(86) PCT No.: PCT/JP2014/083344
§ 371 (c)(1),
(2) Date: Jun. 8, 2016

(87) PCT Pub. No.: WO2015/093505
PCT Pub. Date: Jun. 25, 2015

(65) Prior Publication Data
US 2016/0354686 A1    Dec. 8, 2016

(30) Foreign Application Priority Data
Dec. 20, 2013   (JP) ................. 2013-264542

(51) Int. Cl.
*A63F 13/525* (2014.01)
*A63F 13/25* (2014.01)
(Continued)

(52) U.S. Cl.
CPC ............ *A63F 13/25* (2014.09); *A63F 13/497* (2014.09); *A63F 13/5372* (2014.09); *A63F 13/85* (2014.09); *A63F 13/86* (2014.09)

(58) Field of Classification Search
CPC ....................................................... A63F 13/12
See application file for complete search history.

(56) References Cited

U.S. PATENT DOCUMENTS

| 2003/0083132 A1* | 5/2003 | Berg ................. G07F 17/32 463/40 |
| 2006/0195574 A1 | 8/2006 | Sakai |

(Continued)

FOREIGN PATENT DOCUMENTS

JP    2007094877    4/2007

OTHER PUBLICATIONS

International Search Report for corresponding EP Application No. 14872858.7, 7 pages, dated Jun. 23, 2017.
(Continued)

*Primary Examiner* — Omkar Deodhar
(74) *Attorney, Agent, or Firm* — Matthew B. Dernier, Esq.

(57) ABSTRACT

There are provided a capture notification system, a capture notification method, a program, an information storage medium, and an information processing device for allowing a user executing a program to become aware of another user capturing an image indicating content of execution of the program. A capture request receiving section receives a capture request of an image indicating content of execution of a program from a capture requesting user requesting capture of the image. A notifying section notifies a capture object user that the image is to be captured in response to the receipt of the capture request.

12 Claims, 16 Drawing Sheets

| IDENTIFICATION INFORMATION | POLICY DATA |
|---|---|
| Player A | CAPTURE APPROVED FOR FRIEND |
| Player B | CAPTURE DENIED |
| Player C | CAPTURE APPROVED |

(51) Int. Cl.
*A63F 13/85* (2014.01)
*A63F 13/5372* (2014.01)
*A63F 13/497* (2014.01)
*A63F 13/86* (2014.01)

(56) References Cited

U.S. PATENT DOCUMENTS

| | | | |
|---|---|---|---|
| 2007/0093291 A1* | 4/2007 | Hulvey | A63F 13/06 463/36 |
| 2007/0099699 A1* | 5/2007 | Plotkin | B44C 1/228 463/30 |
| 2009/0118008 A1 | 5/2009 | Kobayashi | |
| 2009/0131177 A1 | 5/2009 | Pearce | |
| 2013/0159375 A1 | 6/2013 | Perry | |

OTHER PUBLICATIONS

International Search Report for corresponding PCT Application No. PCT/JP2014/083344, 4 pages, dated Mar. 10, 2015.
10 Byo Inai nl Shometsu suru Shashin 0 Okureru Apuri 'Snapchat' 0 Tsukatte mimashita, [online], Kabushiki Kaisha OSA, Gigazine, [Internet <URL:http://gigazine.net/news/20130822-snapchat-review/>, 27 pages (Aug. 22, 2013).
Kabushiki Kaisha Qbist, Nintendo Gamecube Books Phantasy Star Online Episode 1 & 2 Ultimate System X Story Edition, 4th edition, Softbank Publishing Inc., 11 pages, paragraph of 'E wa Bankoku Kyotsu: Symbol Chat' (Jun. 27, 2003).
International Preliminary Report on Patentability for corresponding PCT Application No. PCT/JP2014/083344, 14 pages, dated Jun. 30, 2016.

\* cited by examiner

| IDENTIFICATION INFORMATION | POLICY DATA |
|---|---|
| Player A | CAPTURE APPROVED FOR FRIEND |
| Player B | CAPTURE DENIED |
| Player C | CAPTURE APPROVED |

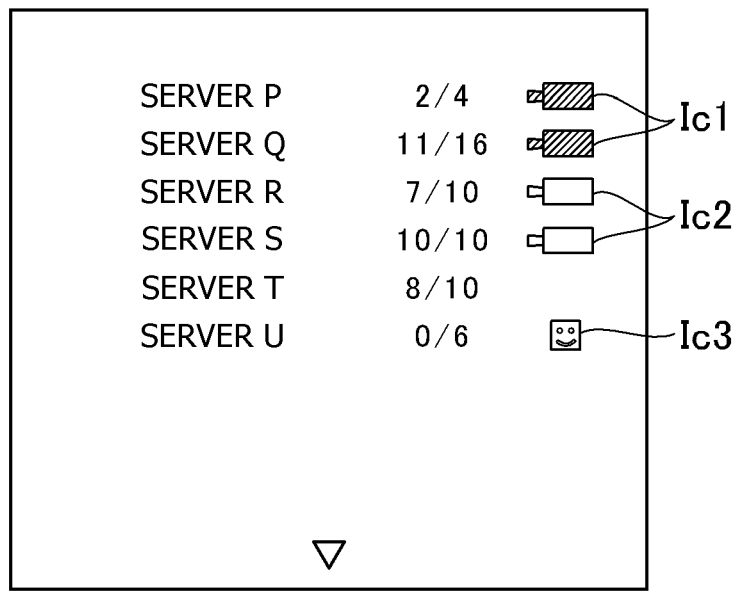
F I G . 2 3

CAPTURE NOTIFICATION SYSTEM, CAPTURE NOTIFICATION METHOD, PROGRAM, INFORMATION STORAGE MEDIUM, AND INFORMATION PROCESSING DEVICE

TECHNICAL FIELD

The present invention relates to a capture notification system, a capture notification method, a program, an information storage medium, and an information processing device.

BACKGROUND ART

There exist techniques for capturing an image indicating the content of execution of a program, such as an image indicative of the play content of the program of a game (see PTL 1). In the case of programs each executed by a plurality of users, such as the program of a game participated in by a plurality of players, it has been possible in recent years for each user to capture an image indicating the content of the execution of the program. The images thus captured are stored into devices used by the users or uploaded to image publishing websites, for example.

CITATION LIST

Patent Literature

[PTL 1] U.S. Patent Application Publication No. 2009/0118008

SUMMARY

Technical Problem

With the existing technology, a user executing a program is not notified of another user capturing an image of the execution content of the program. For example, a user participating as one of the players in a game is not notified of another user capturing an image of the play content of the game. The image capturing user may be a user participating as a player in the game, or a user merely watching the play content of the game. The user executing the program thus remains unaware of another user capturing an image of the execution content of the program.

The present invention has been made in view of the above circumstances. An object of the present invention is to provide a capture notification system, a capture notification method, a program, an information storage medium, and an information processing device for enabling a user executing a program to become aware of another user capturing an image of the execution content of the program.

Solution to Problem

In solving the above problem and according to the present invention, there is provided a capture notification system including: a capture request receiving section configured to receive a capture request of an image indicating content of execution of a program from a capture requesting user requesting capture of the image; and a notifying section configured to notify a capture object user that the image is to be captured in response to the receipt of the capture request.

According to the present invention, there is provided a capture notification method including: a step of receiving a capture request of an image indicating content of execution of a program from a capture requesting user requesting capture of the image; and a step of notifying a capture object user that the image is to be captured in response to the receipt of the capture request.

According to the present invention, there is provided a program for causing a computer to execute: a procedure of receiving a capture request of an image indicating content of execution of a program from a capture requesting user requesting capture of the image; and a procedure of notifying a capture object user that the image is to be captured in response to the receipt of the capture request.

According to the present invention, there is provided a computer-readable information storage medium which records a program for causing a computer to execute: a procedure of receiving a capture request of an image indicating content of execution of a program from a capture requesting user requesting capture of the image; and a procedure of notifying a capture object user that the image is to be captured in response to the receipt of the capture request.

According to the present invention, there is provided an information processing device including a capture requesting section configured to notify a capture object user of a capture request of an image indicating content of execution of a program, the capture request being received from a capture requesting user requesting capture of the image.

According to the present invention, there is provided another program for causing a computer to execute a procedure of notifying a capture object user of a capture request of an image indicating content of execution of a program, the capture request being received from a capture requesting user requesting capture of the image.

According to the present invention, there is provided another computer-readable information storage medium which records a program for causing a computer to execute a procedure of notifying a capture object user of a capture request of an image indicating content of execution of a program, the capture request being received from a capture requesting user requesting capture of the image.

According to the present invention, there is provided another information processing device including: a notification receiving section configured to receive a notification that an image indicating content of execution of a program is to be captured, the notification being transmitted in response to receipt of a capture request of the image from a capture requesting user requesting capture of the image; and a notifying section configured to notify a capture object user that the image is to be captured in response to the receipt of the notification.

According to the present invention, there is provided a further program for causing a computer to execute: a procedure of receiving a notification that an image indicating content of execution of a program is to be captured, the notification being transmitted in response to receipt of a capture request of the image from a capture requesting user requesting capture of the image; and a procedure of notifying a capture object user that the image is to be captured in response to the receipt of the notification.

According to the present invention, there is provided a further computer-readable information storage medium which records a program for causing a computer to execute: a procedure of receiving a notification that an image indicating content of execution of a program is to be captured, the notification being transmitted in response to receipt of a capture request of the image from a capture requesting user requesting capture of the image; and a procedure of notifying a capture object user that the image is to be captured in response to the receipt of the notification.

Thus according to the present invention, the capture object user is notified that the image is to be captured in response to the receipt of the capture request from the capture requesting user. This allows the user executing the program to become aware of another user capturing the image indicating the execution content of the program according to the present invention.

In one aspect of the present invention, the program may be the program of a game to be participated in by a plurality of users including the capture requesting user and the capture object user.

In one aspect of the present invention, the notifying section may notify the capture object user of identification information about the capture requesting user, thereby notifying the capture object user that the image is to be captured by the capture requesting user.

In one aspect of the present invention, the capture notification system may further include a display controlling section configured to indicate that the image is to be captured on a display section used by the capture object user to be notified of the capture of the image.

Preferably in this aspect, the display controlling section may cause a specific position on the display section which corresponds to the capture requesting user to indicate that the image is to be captured.

In one aspect of the present invention, the notifying section may change the manner in which a light-emitting section of a controller operated by the capture requesting user is illuminated, thereby notifying the capture object user that the image is to be captured.

BRIEF DESCRIPTION OF DRAWINGS

FIG. 23 is a schematic diagram depicting a typical game server list display screen.

DESCRIPTION OF EMBODIMENT

One preferred embodiment of the present invention is described below in detail with reference to the accompanying drawings.

Figure 1:
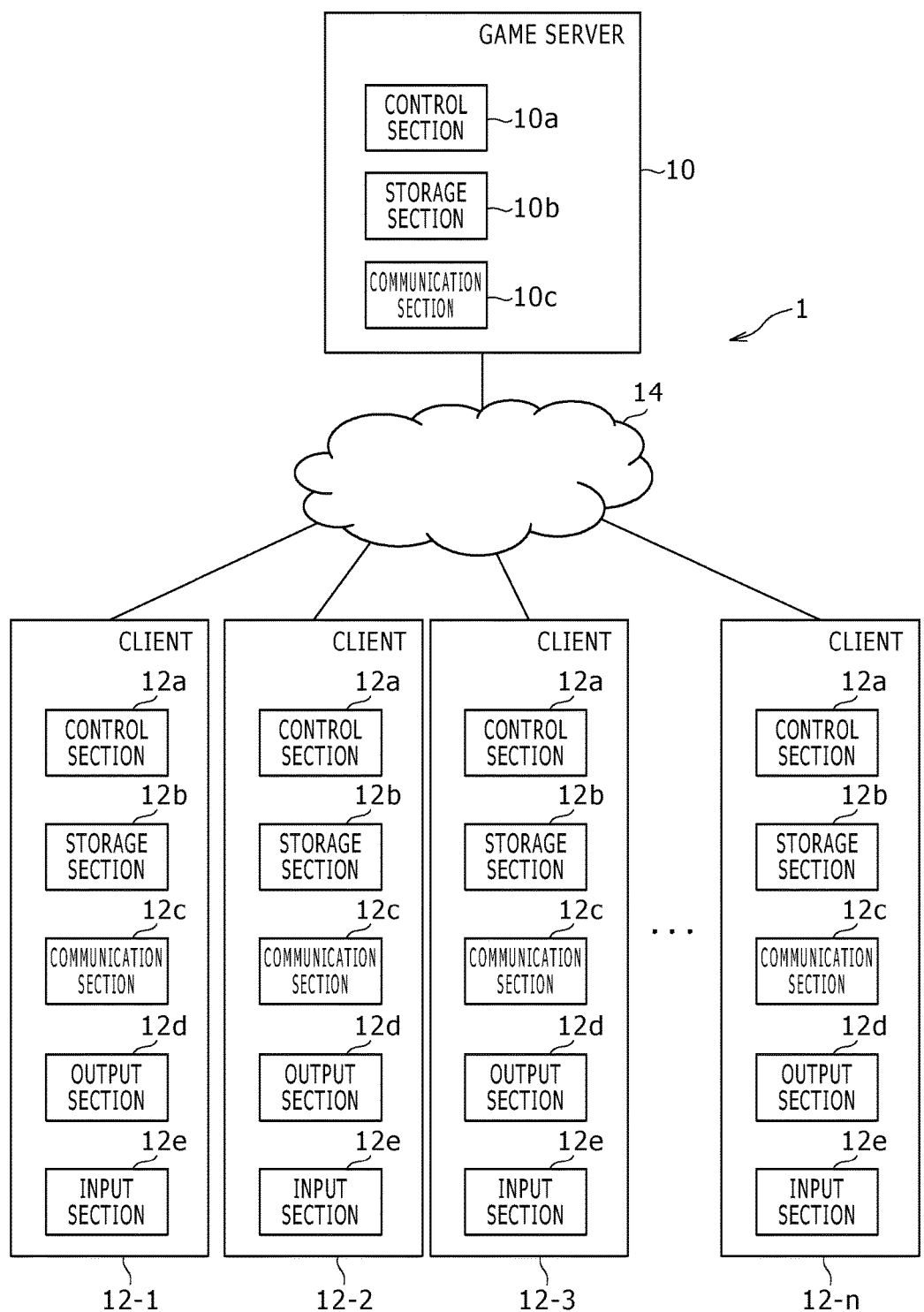
FIG. 1 is a schematic diagram depicting a typical overall configuration of a game system as one embodiment of the present invention.

FIG. 1 is a schematic diagram depicting a typical overall configuration of a game system 1 as one embodiment of the present invention. As depicted in FIG. 1, the game system 1 of the present embodiment includes a game server 10 and clients 12 (12-1, 12-2, 12-3, . . . , and 12-*n*), each structured around a computer. The game server 10 and the clients 12 are connected to a computer network 14 such as the Internet. The game server 10 and the clients 12 are capable of communicating with one another.

The game server 10 is a server computer that executes a game program installed in the server 10, the game being participated in by a plurality of players. With the present embodiment, each user using a different client 12 participates in the game as a player. The game server 10 includes a control section 10*a*, a storage section 10*b*, and a communication section 10*c*, as depicted in FIG. 1. The control section 10*a* is a program control device such as a CPU that performs diverse information processing in accordance with programs stored in the storage section 10*b*. The storage section 10*b* is a hard disk drive or one of such storage devices as a ROM and a RAM. The communication section 10*c* is a communication interface for transmitting and receiving data to and from the clients 12 via the computer network 14 for example. The game server 10 transmits and receives information to and from each client 12 via the communication section 10*c*.

Each client 12 is a computer used by a user of the game server 10. As such, the client 12 is a personal computer, a game console, a television (TV) set, a handheld video game machine, or a portable information terminal for example. Each client 12 typically includes a control section 12*a*, a storage section 12*b*, a communication section 12*c*, an output section 12*d*, and an input section 12*e*. The control section 12*a* is a program control device such as a CPU that executes diverse information processing in accordance with programs stored in the storage section 12*b*. The control section 12*a* in the present embodiment further includes a GPU (Graphics Processing Unit) that renders images in a frame buffer on the basis of graphics commands and data supplied from the CPU. The storage section 12b is a hard disk drive or one of such storage devices as a ROM and a RAM. The storage section 12b stores the programs and other resources to be executed by the control section 12a. Also, the storage section 12b in the present embodiment provides a frame buffer area in which the GPU renders images. The communication section 12c is a communication interface for transmitting and receiving data to and from the game server 10 via the computer network 14 for example. The client 12 transmits and receives information to and from the game server 10 or to and from another client 12 via the communication section 12c. The output section 12d typically includes a display section such as a display unit for outputting information for display and an audio output unit such as speakers for outputting sounds, the output being performed in accordance with instructions input from the control section 12a for example. The input section 12e typically includes a game controller, a touch pad, a mouse, a keyboard, and a microphone for outputting to the control section 12a the specifics of operations performed by the user.

The game server 10 in the present embodiment executes a game program installed in the server 10, the game being participated in by a plurality of players. What follows is a more detailed description of how the game system 1 of the present embodiment operates in a situation where three players play the game, for example. The three players are assumed to be named player A, player B, and player C. It is also assumed that the client 12-1 is used by player A, the client 12-2 by player B, and the client 12-3 by player C.

The game server 10 of the present embodiment has data registered therein with a view to managing the relations between the players. On the basis of the registered data, a player who is a friend of another player can be identified. In the ensuing description, another player identified as a player friend will be referred to as a friend. With the present embodiment, for example, it is assumed that player C is a friend of player A and that player B is not a friend of player A. The game server 10 in the present embodiment allows a very good friend among the friends to be registered as such. In the ensuing description, the very good friend will be referred to as a special friend.

Each client 12 in the present embodiment has a system program installed therein. Also installed in each client 12 in the present embodiment is a game program on the client 12 side corresponding to the program to be executed by the game server 10. The game program operates on the system program installed in the client 12. In the present embodiment, the game is played when the game program executed by each client 12 operates in communication and coordination with the game program executed by the game server 10.

In the present embodiment, a play image 20 indicating the play content of the game is displayed on a display unit of each client 12 (see FIGS. 2 to 4, 6 to 13, and 21). In the present embodiment, the play image 20 rendered in the frame buffer of a given client 12 is displayed on the display unit of that client 12. The play image 20 thus displayed is updated at a predetermined frame rate.

Figure 2:
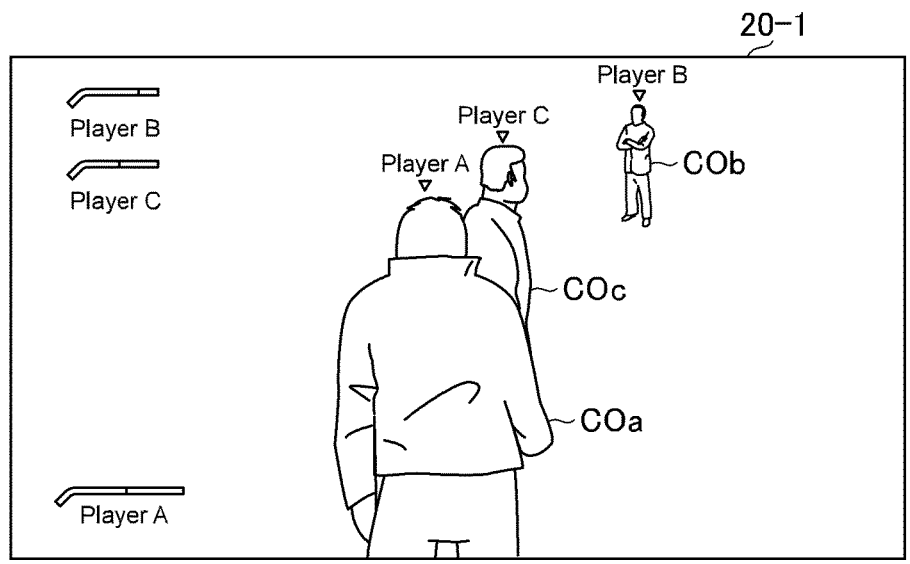
FIG. 2 is a schematic diagram depicting a typical play image.

FIG. 2 is a schematic diagram depicting a typical play image 20-1 displayed on the display unit of the client 12-1. The play image 20-1 shows the play content of the game played by player A. The play image 20-1 in FIG. 2 shows three character objects CO that are objects associated with the three players. Specifically, the play image 20-1 shows a character object COa of player A, a character object COb of player B, and a character object COc of player C. Arranged above each character object CO is identification information such as the name of the player associated with the character object CO. Arranged in the bottom left corner of the play image 20-1 in FIG. 2 is identification information such as the name of player A as the user of the client 12-1 displaying the play image 20-1, together with a power gauge of player A. Arranged in the top left corner of the play image 20-1 in FIG. 2 is identification information such as the names of players B and C that are the other players participating in the game, together with power gauges of these players.

Figure 3:
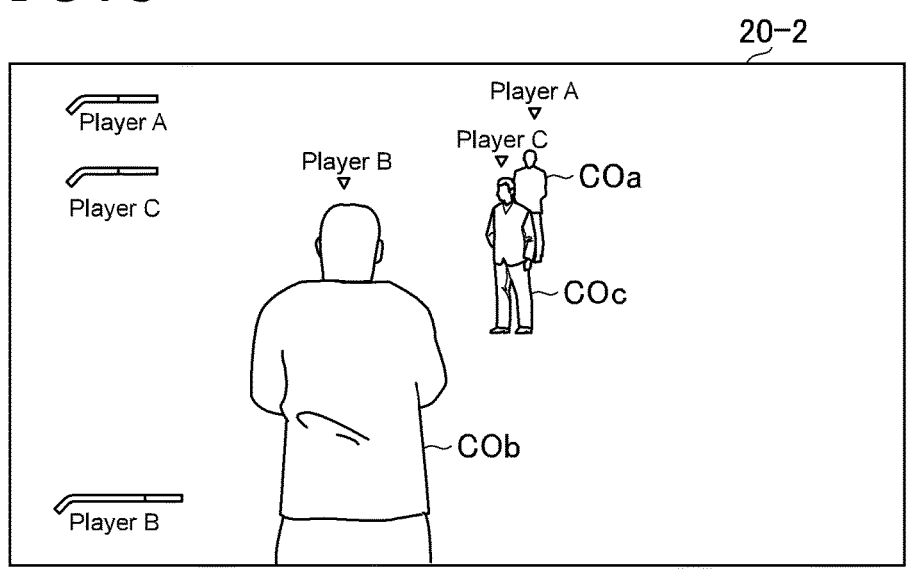
FIG. 3 is a schematic diagram depicting another typical play image.

FIG. 3 is a schematic diagram depicting a typical play image 20-2 displayed on the display unit of the client 12-2. The play image 20-2 shows the play content of the game played by player B. Arranged above each character object CO in the play image 20-2 depicted in FIG. 3 is identification information of the player associated with the character object CO. Also arranged in the bottom left corner of the play image 20-2 in FIG. 3 is identification information such as the name of player B as the user of the client 12-2 displaying the play image 20-2, together with the power gauge of player B. Arranged in the top left corner of the play image 20-2 in FIG. 3 is identification information such as the names of players A and C that are the other players participating in the game, together with the power gauges of these players.

In the present embodiment, the play image 20-1 illustrated in FIG. 2 shows how the character objects CO arranged in a virtual three-dimensional space are seen from the viewpoint associated with player A arranged in the virtual space. Likewise, the play image 20-2 illustrated in FIG. 3 shows how the character objects CO are seen from the viewpoint associated with player B arranged in the virtual space.

In the present embodiment, each user can request the capture of the play image 20 displayed on the display unit of the client 12 used by the user playing the game. In the ensuing description, the play image 20 displayed on the display unit of the client 12 used by a given user will be referred to as the play image 20 of that user. The user who requests the capture of the play image 20 will be referred to as the capture requesting user.

With the present embodiment, the user performs a predetermined capture requesting operation such as the pressing of a predetermined button on the controller. The operation causes the play image 20 of the capture requesting user to be captured and stored into the storage section 12b of the client 12 used by the capture requesting user.

A typical capture requesting operation with the present embodiment is the operation to request the start of capturing a play video composed of a series of play images 20 displayed at a predetermined frame rate on the display unit. In response to the capture start requesting operation, the play video displayed on the display unit of the client 12 used by the capture requesting user starts to be captured. The play video thus captured is encoded before being stored into the storage section 12b of the client 12. The frame rate for the play video displayed on the display unit may be different from the frame rate for the play video to be captured. The capture of the play video continues until the capture requesting user performs a predetermined capture end requesting operation. In the ensuing description, the period from the time the capture start requesting operation is performed to the time the capture end requesting operation is carried out will be referred to as the capture target period.

The present embodiment enables the capture requesting user to set capture conditions for controlling whether or not to capture each of the play images 20 displayed during the capture target period. If the capture conditions are not set, a series of play images 20 displayed during the capture target period will be stored as the play video as described above. If the capture conditions are set, the play images 20 of frames meeting the capture conditions will be stored.

The capture conditions to be set may typically include a condition for starting the capture of a play video, a condition for ending the capture of the play video, and a period during which the capture is to be performed. More specifically, the capture conditions can be set so that the play video is to be captured from 15 seconds before the start of a predetermined event to 15 seconds after the event, or that the play video is to be captured for 10 seconds after a predetermined score has been exceeded, for example.

Suppose that player B has started to capture the play video, for example. In this case, the display unit of the client 12-2 displays the play image 20-2 illustrated in FIG. 4. The identification information about player B is arranged in the bottom left corner of the play image 20-2. Arranged on the right of the identification information about player B is an image I1a indicating that the capture target period is now in effect for the user associated with the identification information. At the end of the play video capture target period, the image I1a is deleted from the play image 20-2. Arranged in the top right corner of the play image 20-2 is an image I2 indicating that the capture of the play video has started. The image I2 is deleted from the play image 20-2 upon elapse of a predetermined time period after the capture of the play video has started.

Figures 4, 5:
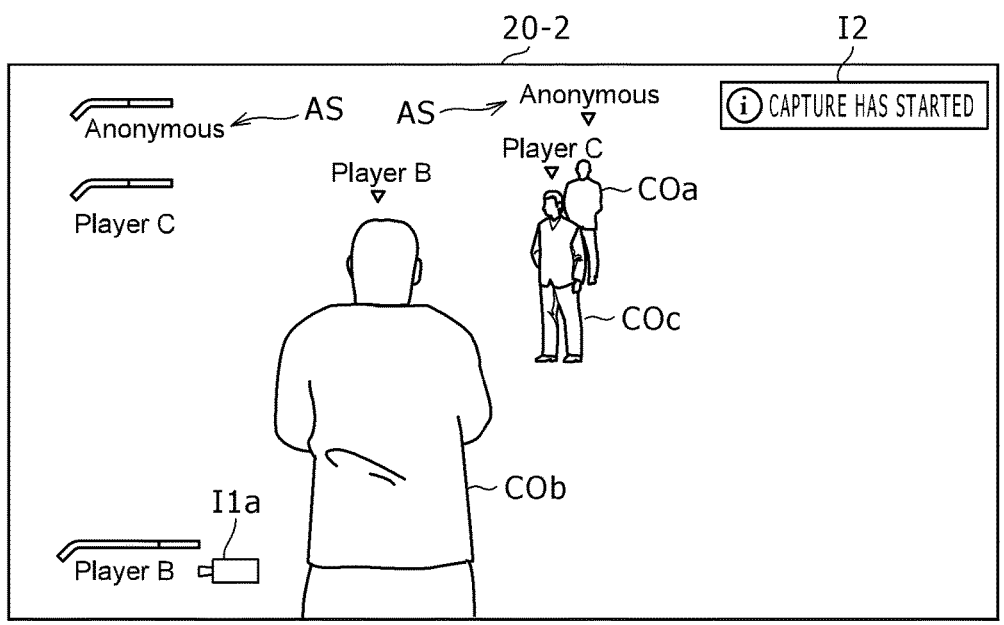
FIG. 4 is a schematic diagram depicting another typical play image.
FIG. 5 is a tabular view listing typical policy data.

With the present embodiment, each user participating in the game as a player can control the capture of the play image 20. Suppose now that the capture of the play image 20 by the user as player B is not approved for the user as player A, for example. In this case, as indicated in FIG. 4, the play image 20-1 to be captured replaces the identification information about player A (i.e., the name of the user as player A in this case) with a highly impersonal name such as an alternative character string AS (denoting "Anonymous", for example). In this manner, the embodiment performs control to prohibit the capture of the identification information about the user who denies capture, for example. In the ensuing description, the information controlled to be prevented from capture such as the user identification information in the above example will be referred to as the confidential information.

The confidential information is not limited to the user identification information. Whereas the confidential information is replaced with the alternative character string AS in the above example, the confidential information may alternatively be subjected to mosaic processing so as to be controlled not to be captured. As another alternative, the character objects CO of the players may be handled as the confidential information, for example. In this case, the character object CO of the player who denies the capture of the play image 20 may be subjected to mosaic processing so that the character object CO will be controlled to be protected against capture.

The present embodiment performs capture control over play images on the basis of policy data depicted in FIG. 5 in association with the user identification information. In the ensuing description, the policy data associated with the identification information about a given user will be referred to as the policy data about that user. The present embodiment enables each user to set his or her policy data for example. In the present embodiment, the client 12 used by a given user transmits the policy data about that user to the game server 10 when the client 12 and the game server 10 start to communicate with each other, for example. FIG. 5 depicts that the policy data about the user as player A is set to be "Capture approved for friend," for example. Because player A is not registered as a friend of player B in the game server 10 as mentioned above, the confidential information about player A is controlled not to be captured as depicted in FIG. 4. FIG. 5 also depicts that the policy data about the user as player C is set to be "Capture approved." In this case, the confidential information about player C is captured as depicted in FIG. 4. FIG. 5 further depicts that the policy data associated with player B is set to be "Capture denied." Thus, for example, when the player A or player C captures the play image 20, the confidential information about player B is controlled not to be captured.

The policy data may also be set to be "Capture approved for special friend." In this case, the confidential information about the player registered as a special friend is controlled to be captured and the confidential information about any other player is controlled not to be captured.

The policy data to be set may further include the number of times the play image 20 or the play video is approved to be captured, the length of the time in which the play video is approved to be captured, and the scene where the play image 20 or the play video is approved to be captured, for example.

The present embodiment thus enables each user to set his or her policy data to control the capture of the play image 20 by the other players as described above. In the above example, it is controlled whether or not to have the confidential information about a given user arranged in the play image 20 to be captured by another user, for example. This makes it possible in the above example to prevent any user from capturing the play image 20 including the confidential information about a given user against the latter user's will.

When the play image 20 is to be captured with the present embodiment, at least the users other than the capture requesting user are notified that the play image 20 is to be captured. Alternatively, the capture requesting user may also be notified that the play image 20 is to be captured. In the ensuing description, the user notified of the capture of the play image 20 will be referred to as the capture object user.

Figure 6:
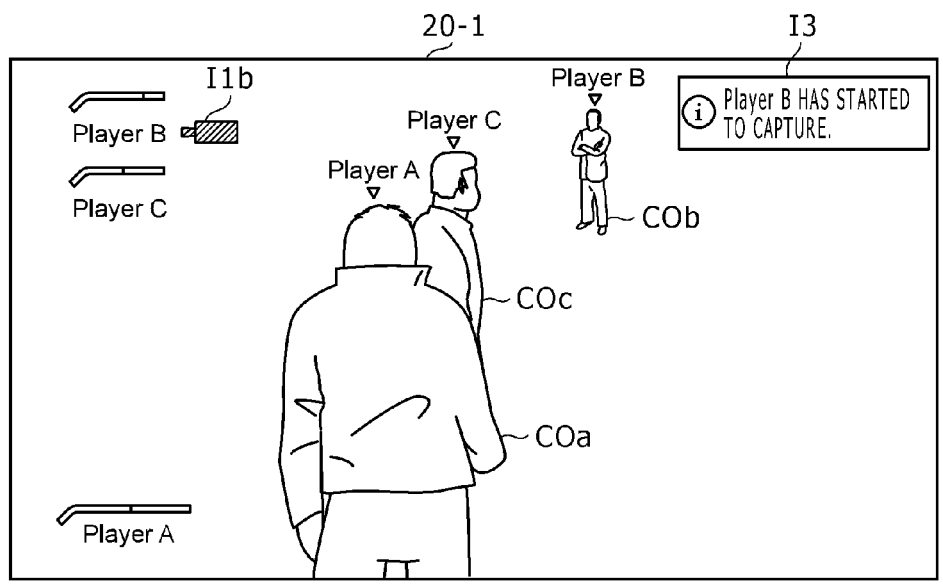
FIG. 6 is a schematic diagram depicting another typical play image.

For example, when player B starts to capture the play video, player A and player C become capture object users. FIG. 6 depicts the typical play image 20-1 displayed on the display unit of the client 12-1 associated with player A who becomes a capture object user when player B has started to capture the play video. Arranged on the right of the identification information about player B in the top left corner of the play image 20-1 is an image I1b indicating that the user associated with the identification information is now in the capture target period. In the present embodiment, the image I1b is made different from the image I1a in terms of the manner of display such as in color. For example, the image I1a is yellow and the image I1b is grey. Because the embodiment causes the image I1b to be displayed in a manner different from the image I1a, the user as player A can recognize that the confidential information about player A is not being captured during the capture target period. At the end of the capture target period, the image I1b is deleted from the play image 20-2. Arranged in the top right corner of the play image 20-1 is an image I3 indicating that player B has started to capture the play video. The image I3 is deleted from the play image 20-1 upon elapse of a predetermined time period after the capture of the play video has started.

Suppose now that the user as player A has performed a predetermined capture approving operation, for example.

Figure 7:
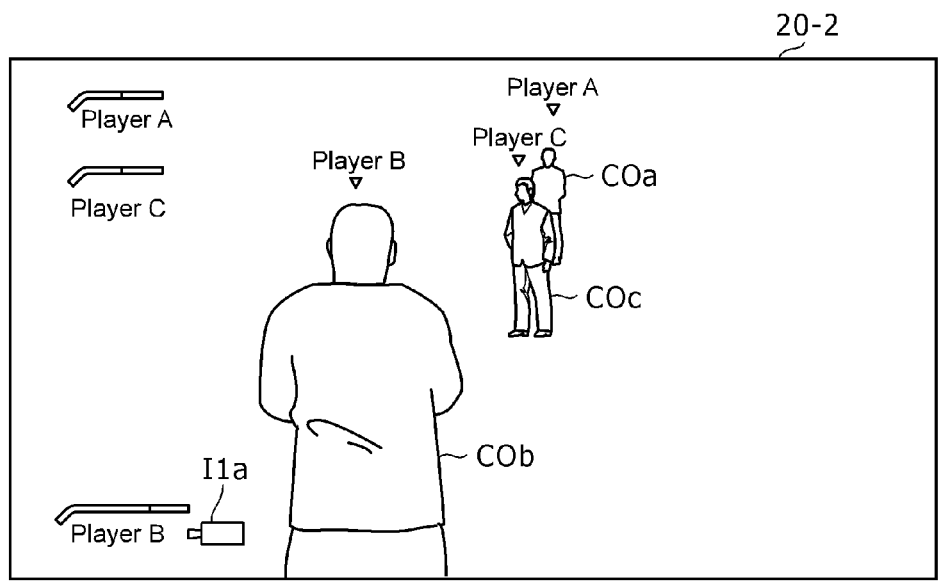
FIG. 7 is a schematic diagram depicting another typical play image.

The operation causes the play image 20-2 illustrated in FIG. 7 to be displayed on the client 12-2. The play image 20-2 has the confidential information (identification information in this case) about player A arranged therein. The play image 20-2 is captured and stored into the storage section 12b of the client 12-2.

Figure 8:
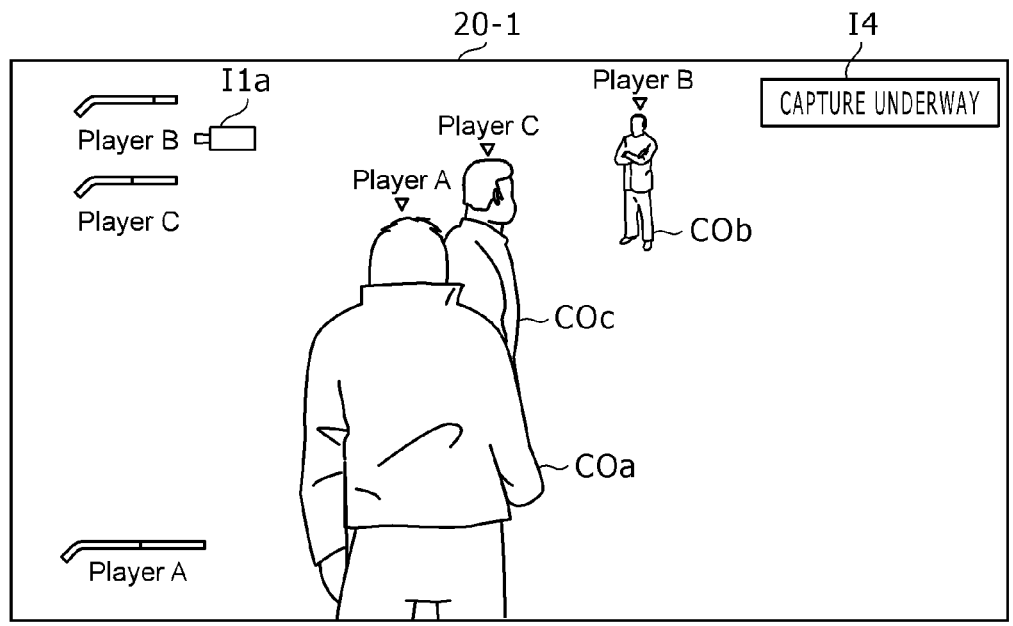
FIG. 8 is a schematic diagram depicting another typical play image.

Also, when the user as player A has performed the predetermined capture approving operation, the client 12-1 displays the play image 20-1 in FIG. 8 in which the image I1a is arranged on the right of the identification information about player B. This allows the user as player A to recognize that player B is capturing the play image 20 in which the confidential information about user is arranged.

With the present embodiment, as described above, when the user of the client 12-2 is capturing the play image 20, the user of the client 12-1 is notified of the capture. The image I1a is displayed on the right of the identification information about player B in the example of FIG. 6, and the image I1a is displayed on the right of the identification information about player B in the example of FIG. 8. The image display notifies the user as player A that the user as player B is capturing the play image 20. The embodiment thus enables each user to become aware of any other user capturing the play image 20. This enables each user to prevent the play image 20 from getting captured by another user in an unintended manner.

Furthermore, as depicted in FIG. 8, suppose that the character object COa is arranged in the play image 20-2 to be captured by the client 12-2, i.e., that the character object COa is within the field of view of the viewpoint associated with player B, for example. In this case, as depicted in FIG. 8, the embodiment displays an image I4 in the top right corner of the play image 20-1, the image I4 indicating that the character object COa associated with player A is being captured. The present embodiment thus gives different notifications to the capture object user in two cases: when the object associated with the capture object user is arranged in the image being captured, and when the object associated with the capture object user is not arranged in the image being captured. In this manner, the embodiment enables each user to recognize that the play image 20 in which the object associated with the user is arranged is being captured.

The technique for giving different notifications to the capture object user is not limited to what was discussed above. For example, when the character object COa is not arranged in the play image 20-2 captured by the client 12-2, the play image 20-1 in which the image I1a is arranged may be displayed on the display unit of the client 12-1. When the character object COa is arranged in the play image 20-2 captured by the client 12-2, the play image 20-1 in which the images I1a and I4 are arranged may be displayed on the display unit of the client 12-1. As another example, when the character object COa is arranged in the play image 20-2 to be captured, the image I1a may be arranged in the play image 20-1. When the character object COa is not arranged in the play image 20-2 to be captured, the image I1a may not be arranged in the play image 20-1.

Figure 9:
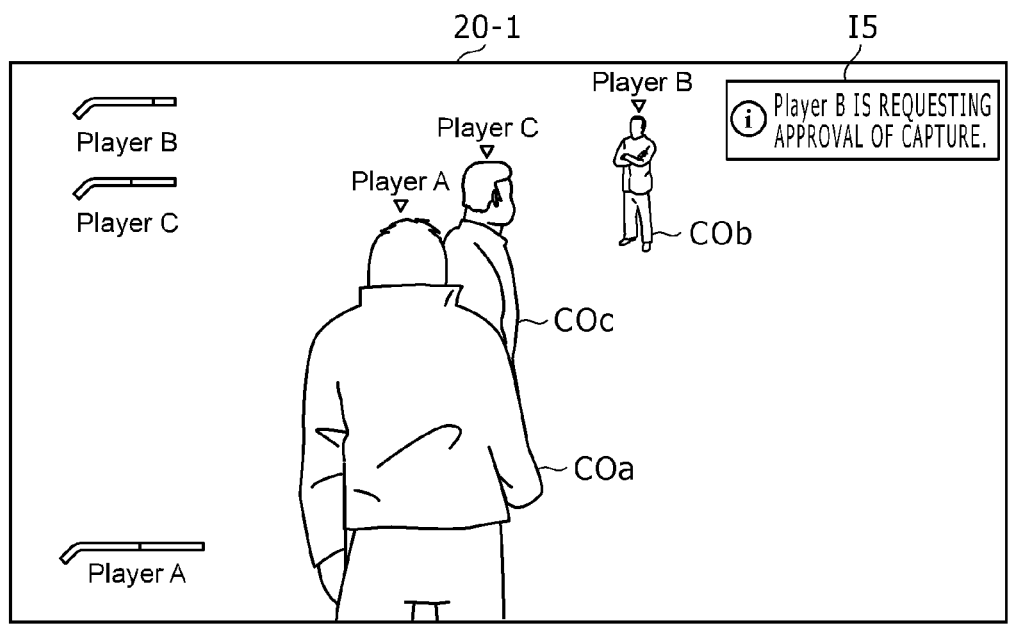
FIG. 9 is a schematic diagram depicting another typical play image.

The present embodiment enables the user as player B to make a capture approval request when the confidential information about player A is controlled not to be captured, as depicted in FIGS. 4 and 6. For example, suppose that the user as player B has performed a predetermined approval requesting operation when the confidential information about player A is controlled not to be captured. In this case, as depicted in FIG. 9, the client 12-1 displays the play image 20-1 in which an image I5 is arranged, the image I5 indicating that an approval request notification is received from player B.

Figure 10:
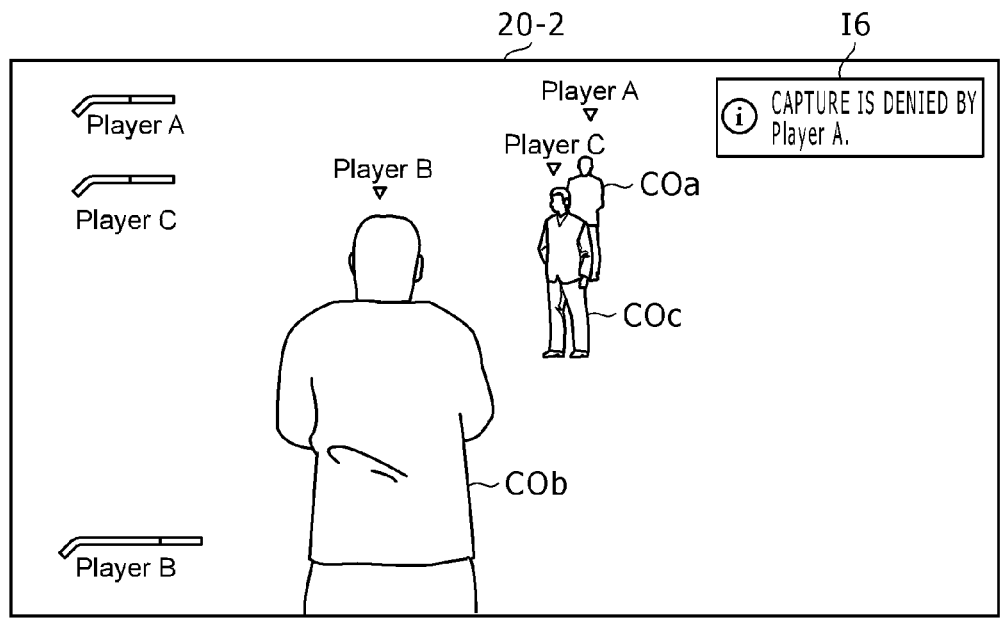
FIG. 10 is a schematic diagram depicting another typical play image.

Suppose now that the user as player A has performed a predetermined capture denying operation. In this case, as depicted in FIG. 10, the display unit of the client 12-2 displays the play image 20-2 in which an image I6 is arranged in the top right corner, the image I6 indicating that the capture has been denied for player B. If the user as player A has performed the above-mentioned capture approving operation, the display unit of the client 12-2 displays the play image 20-2 with a specific image arranged in the top right corner, the specific image indicating that the capture is approved for player B. Also in this case, the play image 20-2 illustrated in FIG. 7 is captured and stored into the storage section 12b of the client 12-2 as described above. In this manner, the embodiment may prompt the user denying the capture of his or her confidential information to approve the capture of the confidential information. The appealing user can recognize whether the capture of the confidential information of interest is approved or denied.

Figure 11:
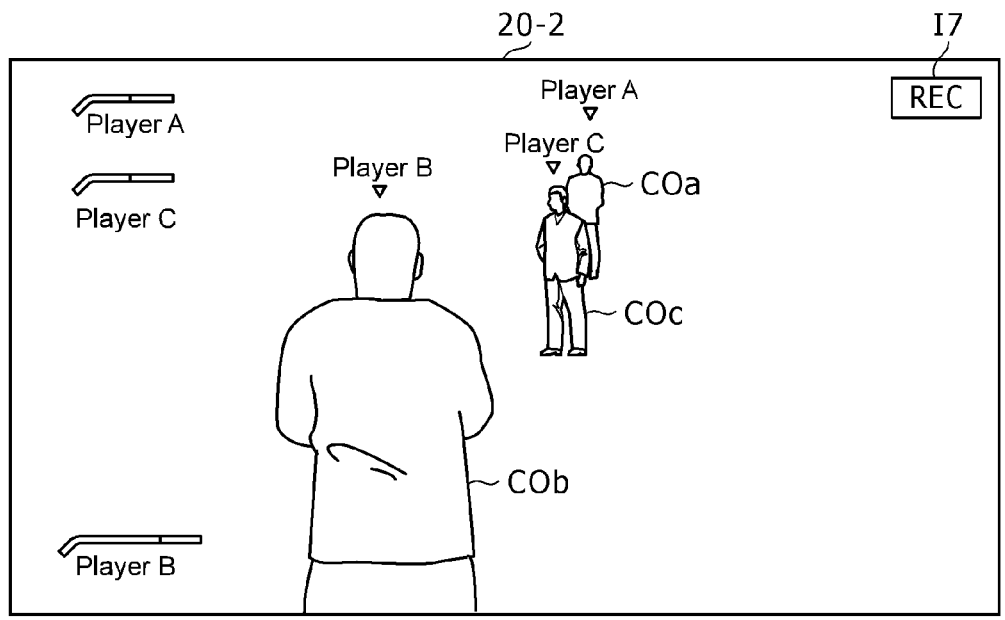
FIG. 11 is a schematic diagram depicting another typical play image.

The manner in which the play image 20-2 of the capture requesting user is displayed during capture of the play video is not limited to what is illustrated in FIGS. 4 and 7. For example, as depicted in FIG. 11, the image I1a may be replaced with a recording image I7 in the right top corner of the play image 20-2, the image I7 indicating that the play video is being captured by the client 12-2.

Figure 12:
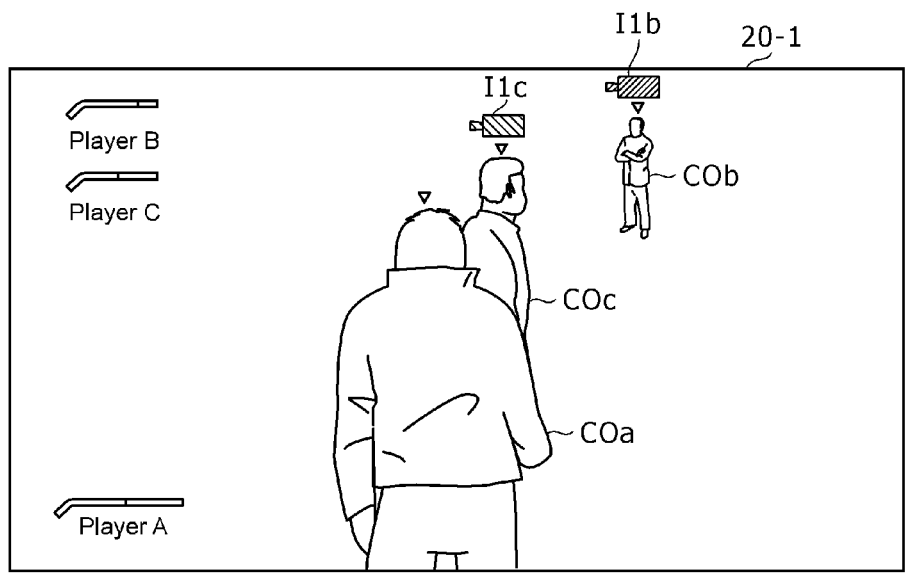
FIG. 12 is a schematic diagram depicting another typical play image.

A plurality of users may be allowed to capture the play image 20. FIG. 12 depicts the play image 20-1 displayed on the display unit of the first client 12-1 while the user as player B and the user as player C are capturing the play image 20.

In the example of FIG. 12, the capture of the play video is controlled on the basis of the policy data depicted in FIG. 5. Consequently, the play image 20-2 in which the confidential information about player A is arranged is controlled not to be captured by the user as player B as described above. The image I1b is thus arranged above the character object COb of player B in the play image 20-1 in FIG. 12.

As depicted in FIG. 5, the policy data associated with player A is set to be "Capture approved for friend." As mentioned above, player C is a friend of player A. This allows player C to capture the play image 20 in which the confidential information about player A is arranged. It is assumed here that the frame in which the play image 20 in FIG. 12 is displayed does not meet the capture conditions set by the user as player C. In this case, the embodiment causes an image I1c to appear above the character object COb of player C in the play image 20-1 in FIG. 12. The image I1c is displayed in a manner different from the image I1a or I1b, such as in a different color. For example, the image I1c may be blue. If the capture conditions set by the user as player C are met, the image I1a will be arranged at the position of player C. In this manner, the display unit may display the play image 20 in which an appropriate image is arranged at the position corresponding to the capture requesting user, the arranged image indicating that the capture requesting user does not meet the capture conditions or that the capture requesting user meets the capture conditions. This enables the capture object user to recognize whether or not the current frame meets the capture conditions set by the capture requesting user. The color of the image I1b or that of the image I1c may be associated with the user currently capturing the play image 20. Also, the images I1b and I1c may be given numbers associated with the corresponding players.

The images I1a, I1b and I1c may be arranged anywhere in the play image 20 as long as each of them is positioned in a manner corresponding to the capture requesting user. For example, as depicted in FIG. 12, the images I1b and I1c may be arranged not on the right of the identification information about the capture requesting user but above the character objects CO associated with the capture requesting user. In this manner, the capture object user may be notified that the play image 20 is being captured by the capture requesting user.

Figure 13:
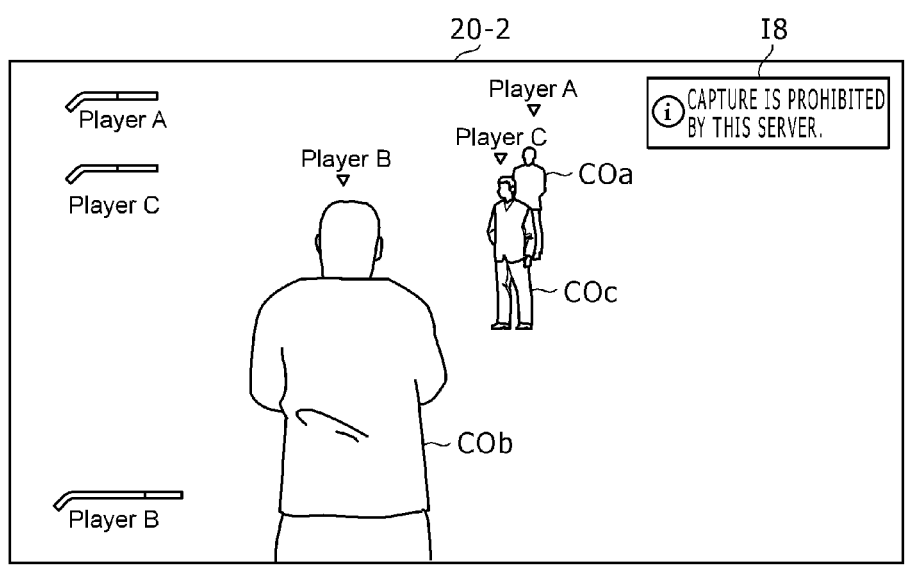
FIG. 13 is a schematic diagram depicting another typical play image.

The game server 10 may provide blanket control over the capture of the play image 20 regardless of the policy data about the users. For example, the game server 10 may perform control to prohibit the capture of the play image 20 without exception. In this case, if the user as player B performs the capture start requesting operation, the play image 20-2 in which an image I8 is arranged is displayed on the display unit of the client 12-2 as depicted in FIG. 13, the image I8 indicating that the capture of the play video is prohibited. Where the game server 10 prohibits the start of capturing the play video, the play image 20-2 depicted in FIG. 13 may be displayed on the display unit of the client 12-2.

As another example, the play image 20 being displayed may be different from the play image 20 to be stored. For instance, the display unit of the client 12-2 may display the play image 20-2 depicted in FIG. 4, while the play image 20-2 without the images I1a and I2 may be stored.

Explained below in more detail are the functions of the game system 1 regarding the notification of the play image 20 to be captured and the control over the capture of the play image 20, as well as the process performed by the game system 1.

Figure 14:
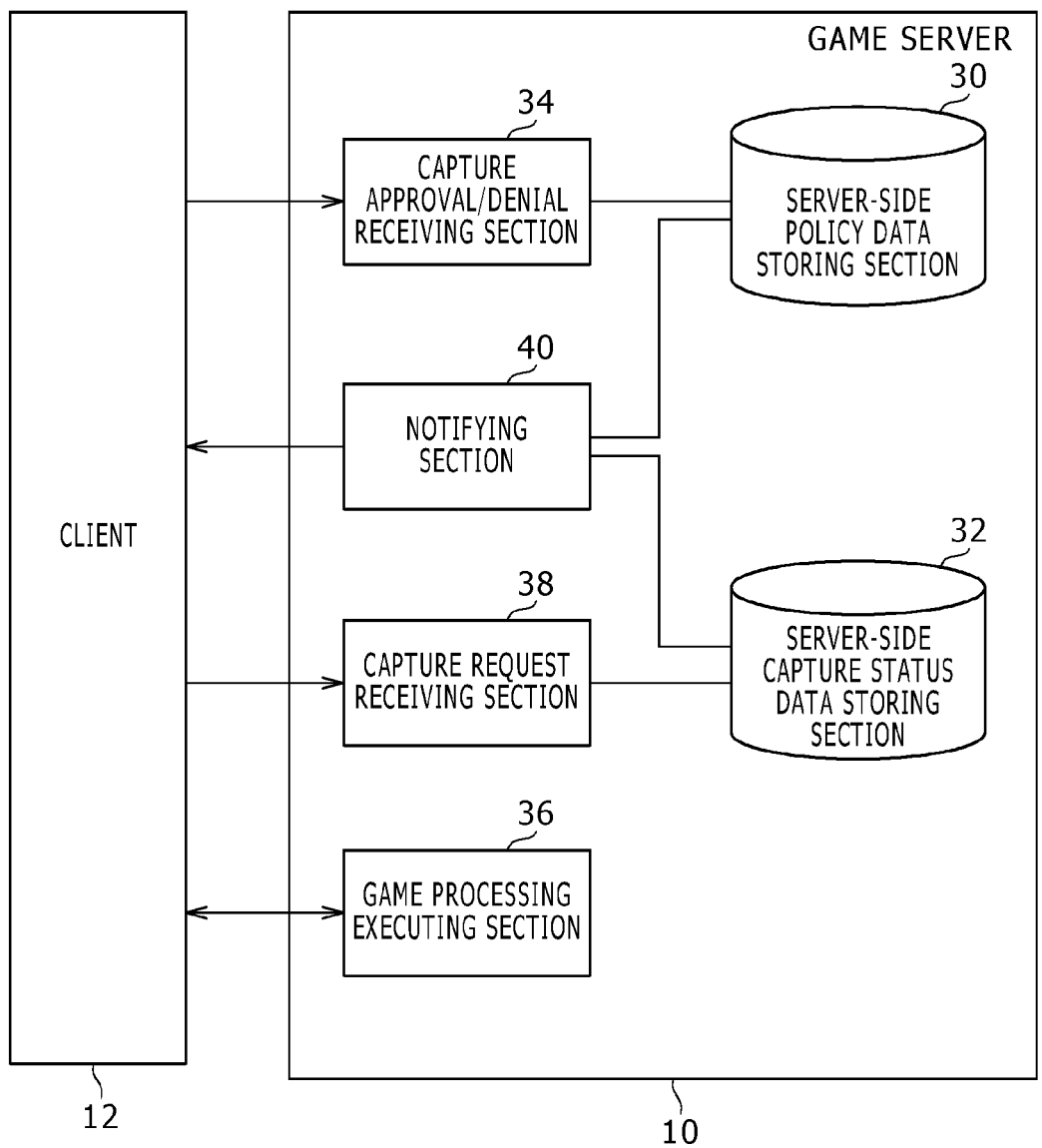
FIG. 14 is a functional block diagram depicting typical functions implemented by a game server in one embodiment of the present invention.

FIG. 14 is a functional block diagram depicting typical functions implemented by the game server 10 in the present embodiment. The game server 10 in the present embodiment, it should be noted, is not necessarily required to implement all the functions depicted in FIG. 14. The game server 10 may further implement functions other than those depicted in FIG. 14.

The game server 10 in the present embodiment functionally includes a server-side policy data storing section 30, a server-side capture status data storing section 32, a capture approval/denial receiving section 34, a game processing executing section 36, a capture request receiving section 38, and a notifying section 40, for example. The server-side policy data storing section 30 and the server-side capture status data storing section 32 are practiced mainly by use of the storage section 10b. The game processing executing section 36 is practiced mainly by use of the control section 10a and communication section 10c. The capture request receiving section 38 and the notifying section 40 are practiced mainly by use of the communication section 10c.

The above functions are implemented by the control section of the game server 10 executing a program installed in the game server 10 working as a computer, the program including the commands representing these functions. This program is supplied to the game server 10 by means of a computer-readable information storage medium such as an optical disk, a magnetic disk, a magnetic tape, a magneto-optical disk or a flash memory, or by way of a computer network such as the Internet.

The server-side policy data storing section 30 stores the policy data associated with the identification information about users depicted in FIG. 5. The policy data in the present embodiment denotes the approval or denial of the capture of an image indicating the execution content of the program. Specifically, the policy data indicates whether the capture of the play image 20 by the capture requesting user requesting the capture of the image is approved or denied in the present embodiment.

The server-side capture status data storing section 32 stores capture status data indicating the capture status of the play image 20. The capture status data may include the identification information about the capture requesting user, the positions and postures of the character objects CO, and the above-mentioned capture conditions, for example. In the ensuing description, the capture status data including the identification information about a given user will be referred to as the capture status data about that user. If there are a plurality of capture requesting users, the present embodiment allows the server-side capture status data storing section 32 to store the capture status data about these capture requesting users.

In the present embodiment, the capture status data is associated with status information indicating whether or not the current frame meets the capture conditions. If the frame fails to meet the capture conditions, the status information is set to be "Stop," for example. Where the frame meets the capture conditions, the status information may be set to be "Record."

From the user who executes the program, the capture approval/denial receiving section 34 receives the approval or denial of the capture of an image indicating the execution content of the program by the user requesting the capture of the image. In the present embodiment, the capture approval/denial receiving section 34 receives from the capture object user his or her approval or denial of the capture of the play image 20 by the capture requesting user for example. More specifically, the capture approval/denial receiving section 34 receives the policy data about the capture object user, the policy data being transmitted from the client 12 used by the capture object user, for example. The capture approval/denial receiving section 34 stores the received policy data into the server-side policy data storing section 30.

The game processing executing section 36 executes the game program installed in the game server 10. The game processing executing section 36 in the present embodiment may receive, at a predetermined frame rate, operation input information transmitted from the client 12 used by each user participating in the game as a player for example, the operation input information representing the input operation regarding the game. The game processing executing section 36 proceeds to generate game status data about the current frame on the basis of the game status data about the preceding frame, the game status data indicating the execution status of the game and on the received operation input information. This is how the present embodiment generates the game status data at the predetermined frame rate. The game status data may typically indicate the positions and postures of the character objects CO as well as the position of the point of view and the line of sight associated with each player. The game processing executing section 36 in the present embodiment transmits to each client 12 the game status data generated in the current frame at the predetermined frame rate.

The capture request receiving section 38 receives a capture request transmitted from the client 12 used by the capture requesting user. For example, the present embodiment permits receipt of a capture start request and a capturer end request for starting and ending the capture of the play video, the request being associated with the capture status data about the capture requesting user.

Upon receipt of the capture start request to start capturing the play video, the capture request receiving section 38 in the present embodiment stores the capture status data associated with the capture start request into the server-side capture status data storing section 32. Upon receiving the capture end request to end the capture of the play video, the capture request receiving section 38 deletes the capture status data associated with that capture end request from the server-side capture status data storing section 32.

During the capture target period, the capture request receiving section 38 receives the status information associated with the identification information about the capture requesting user at a predetermined frame rate. As discussed above, if the frame of interest meets the capture conditions set by the capture requesting user as mentioned above, the capture request receiving section 38 receives the status information set to be "Record." If the frame fails to meet the capture conditions, the capture request receiving section 38 receives the status information set to be "Stop." The capture request receiving section 38 proceeds to update to the received status information the status information associated with the capture status data about the capture requesting user and currently stored in the server-side capture status data storing section 32.

In response to the receipt of the capture request, the notifying section 40 notifies the capture object user that an image indicating the content of the program execution currently performed by the game server 10 is to be captured. For example, upon receipt of a play video capture start request, the notifying section 40 in the present embodiment transmits a play video capture start notification to the client 12 used by the capture object user, the notification being associated with the capture status data about the capture requesting user. Upon receipt of a play video capture end request, the notifying section 40 transmits a play video capture end notification to the client 12 used by the capture object user, the notification being associated with the capture status data about the capture requesting user. In the present embodiment, the capture start notification and the capture end notification are also transmitted to the capture requesting user.

Also in the present embodiment, the notifying section 40 notifies the capture object user of the identification information about the capture requesting user. This notifies the capture object user that the play image 20 is to be captured by the capture requesting user identified by the identification information. Specifically, the notifying section 40 transmits to the capture object user a capture start notification associated with the capture status data including the identification information about the capture requesting user, for example.

Also, the notifying section 40 in the present embodiment transmits, to the client 12 used by each user participating in the game as a player, the policy data about the users participating in the game as players including the user of the client 12.

Figure 15:
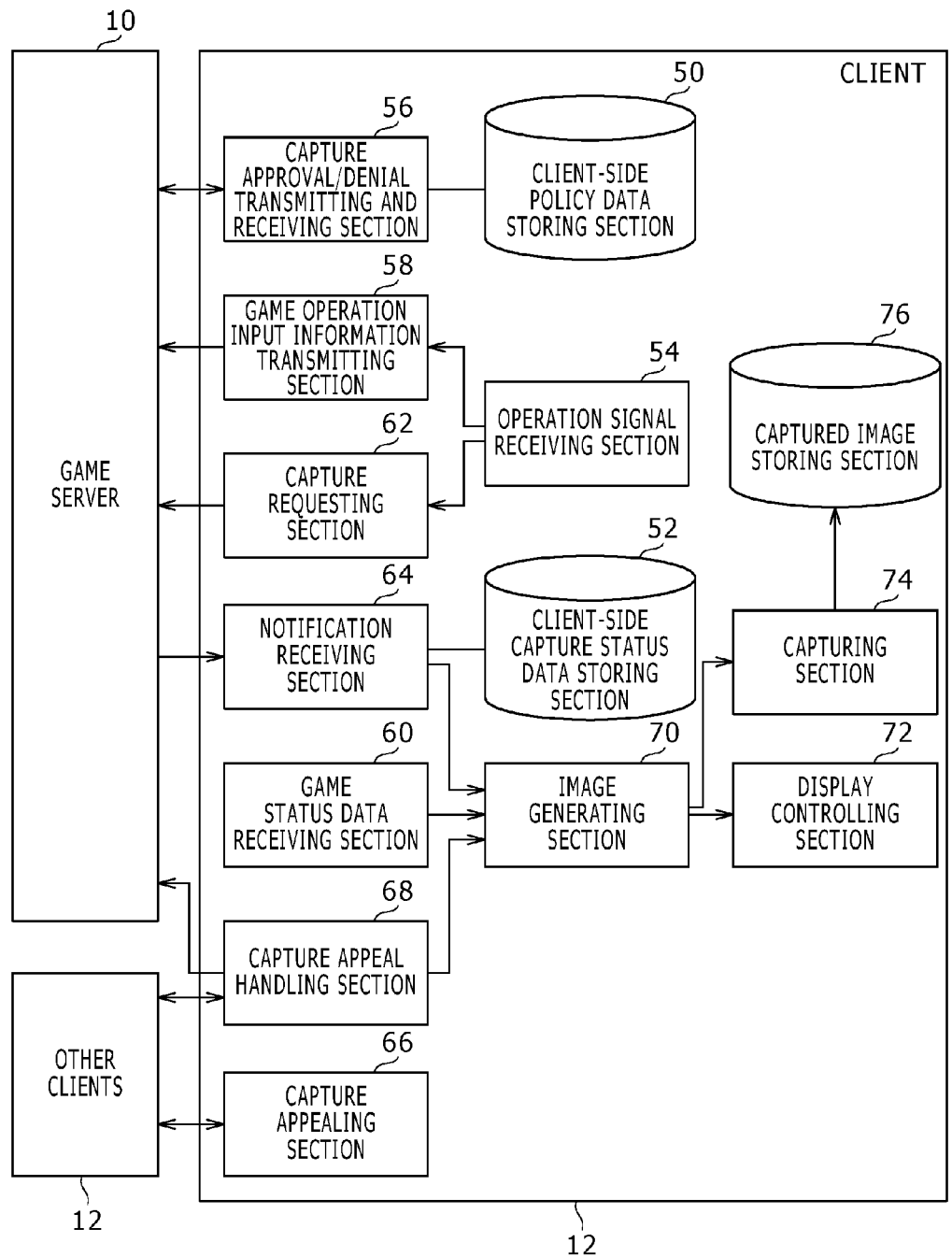
FIG. 15 is a functional block diagram depicting typical functions implemented by a client in one embodiment of the present invention.

FIG. 15 is a functional block diagram depicting typical functions implemented by one of the clients 12 in the present embodiment. Each client 12 in the present embodiment, it should be noted, is not necessarily required to implement all the functions depicted in FIG. 15. The client 12 may further implement functions other than those depicted in FIG. 15.

Each client 12 in the present embodiment functionally includes a client-side policy data storing section 50, a client-side capture status data storing section 52, an operation signal receiving section 54, a capture approval/denial transmitting and receiving section 56, a game operation input information transmitting section 58, a game status data receiving section 60, a capture requesting section 62, a notification receiving section 64, a capture appealing section 66, a capture appeal handling section 68, an image generating section 70, a display controlling section 72, a capturing section 74, and a captured image storing section 76, for example. The client-side policy data storing section 50, client-side capture status data storing section 52, and captured image storing section 76 are practiced mainly by use of the storage section 12b. The operation signal receiving section 54 is practiced mainly by use of the control section 12a and input section 12e. The capture approval/denial transmitting and receiving section 56, game operation input information transmitting section 58, game status data receiving section 60, capture requesting section 62, notification receiving section 64, capture appealing section 66, and capture appeal handling section 68 are practiced mainly by use of the communication section 12c. The image generating section 70 and the capturing section 74 are practiced mainly by use of the control section 12a and storage section 12b. The display controlling section 72 is practiced mainly by use of the control section 12a, storage section 12b, and output section 12d. In the present embodiment, the above functions are assumed to be implemented by the game program on the side of each client 12. The above functions may alternatively be implemented in part by the system program installed in each client 12. For example, the capturing section 74 and the captured image storing section 76 may be implemented as the system program.

The above functions are implemented by the control section of each client 12 executing a program installed in the client 12 working as a computer, the program including the commands representing these functions. This program is supplied to each client 12 by means of a computer-readable information storage medium such as an optical disk, a magnetic disk, a magnetic tape, a magneto-optical disk or a flash memory, or by way of a computer network such as the Internet, for example.

Like the server-side policy data storing section 30, the client-side policy data storing section 50 stores the policy data depicted in FIG. 5, for example.

Like the server-side capture status data storing section 32, the client-side capture status data storing section 52 stores the capture status data associated with status information.

The capture approval/denial transmitting and receiving section 56 transmits to the game server 10 the approval or denial of a request by the user to capture an image of the content of program execution, i.e., the approval or denial of the request by the capture requesting user to capture the image. The capture approval/denial transmitting and receiving section 56 of each client 12 in the present embodiment transmits to the game server 10 the policy data about the user of the client 12, the policy data being stored in the client-side policy data storing section 50, for example.

The capture approval/denial transmitting and receiving section 56 in the present embodiment receives the policy data associated with the identification information about the user, the policy data being transmitted from the notifying section 40. The capture approval/denial transmitting and receiving section 56 proceeds to store the received policy data into the client-side policy data storing section 50.

The operation signal receiving section 54 receives an operation signal reflecting an operation performed by the user on the controller. The operation signal receiving section 54 in the present embodiment receives the operation signals at a predetermined frame rate. For example, the operation signal receiving section 54 receives an operation signal reflecting an operation to change the execution status of the game. The operation signal receiving section 54 also receives an operation signal reflecting the capture requesting operation regarding the play image 20, such as an operation to make the above-mentioned capture start or capture end request to start or end the capture of the play video. The operation signal receiving section 54 further receives the operation signals reflecting operations such as a capture approving operation, a capture denying operation, and an approval appealing operation.

When the operation signal receiving section 54 has received an operation to change the execution status of the game, the game operation input information transmitting section 58 transmits the operation input information reflecting the operation to the game server 10. The operation input information is received by the game processing executing section 36 as described above.

The game status data receiving section 60 receives, at a predetermined frame rate, the game status data transmitted from the game processing executing section 36.

The capture requesting section 62 transmits a capture request to capture the play image 20. For example, suppose that the operation signal receiving section 54 of the client 12 used by the capture requesting user has received an operation signal reflecting a play image capture requesting operation input by the capture requesting user through the input section 12e. It is assumed here that the operation signal receiving section 54 of the client 12 used by the capture requesting user has received an operation signal reflecting a play video capture start requesting operation, for example. In this case, the capture requesting section 62 transmits to the game server 10 a play video capture start request associated with the capture status data about the capture requesting user. As another example, suppose that the operation signal receiving section 54 of the client 12 used by the capture requesting user has received an operation signal reflecting a play video capture starting and ending operation. In this case, the capture requesting section 62 transmits to the game server 10 a play video capture end request associated with the capture status data about the capture requesting user. These requests are received by the capture request receiving section 38 as described above.

During the capture target period, the capture requesting section 62 of the client 12 used by the capture requesting user further transmits to the game server 10 the status information about the current frame in association with the identification information about the capture requesting user at a predetermined frame rate.

The notification receiving section 64 receives various notifications transmitted from the notifying section 40. In the present embodiment, the notification receiving section 64 receives a play video capture start notification and a play video capture end notification associated with capture status data for example.

Upon receiving the play video capture start notification, the notification receiving section 64 stores the capture status data associated with the capture start notification into the client-side capture status data storing section 52. Upon receipt of the play video capture end notification, the notification receiving section 64 deletes the capture status data associated with the capture end notification from the client-side capture status data storing section 52.

The capture appealing section 66 notifies the capture object user of a capture approval appeal to let the capture requesting user capture the play image 20, the capture object user so far denying the capture of the play image 20 by the capture requesting user. When the operation signal receiving section 54 in the present embodiment has received a signal reflecting an approval appealing operation, the capture appealing section 66 transmits an approval appeal notification appealing for approval of the capture. Suppose now that the user as player B has performed the operation to appeal for approval from the user as player A, for example. In this case, the capture appealing section 66 of the client 12-2 transmits to the client 12-1 the approval appeal notification associated with the identification information about the user as player B.

The capture appeal handling section 68 receives the approval appeal notification. For example, if the capture appealing section 66 of the client 12-2 transmits to the client 12-1 an approval appeal notification associated with the identification information about the user as player B, the capture appeal handling section 68 of the client 12-1 receives the approval appeal notification. In turn, the capture appeal handling section 68 transmits a notification of approval or denial of the capture to the client 12-2.

For the present embodiment, it is assumed that the approval appeal notification is transmitted and received between the clients 12 through peer-to-peer communication. Alternatively, the game server 10 may relay the approval appeal notifications being transmitted and received.

The image generating section 70 generates the image to be displayed on the display units of the clients 12. In the present embodiment, the image generating section 70 generates the play images 20 illustrated in FIGS. 2 to 4 and 6 to 13, and renders the images in the frame buffer. The embodiment allows the play images 20 to be generated at a predetermined frame rate.

For example, the image generating section 70 in the present embodiment generates a basic play image 20 in accordance with the game status data received by the game status data receiving section 60. The image generating section 70 then overwrites this play image 20 with information reflecting the various notifications received by the notification receiving section 64 and the approval appeal notifications received by the capture appeal handling section 68, the information including the images I1a, I1b, and I2 to I8 in the example.

The display controlling section 72 causes the display unit to display the image generated by the image generating section 70. In the present embodiment, the play image 20 is displayed on the display unit at a predetermined frame rate. The display controlling section 72 in the present embodiment gives an indication that the play image 20 is to be captured as described above, the indication being displayed on the display unit of the client 12 used by the capture object user notified of the impending capture of the play image 20. The display controlling section 72 also gives an indication that the play image 20 is to be captured, the indication being displayed at that position on the display unit which corresponds to the capture requesting user. In this manner, the display controlling section 72 in the present embodiment may play the role of a notifying section notifying the capture object user that the play image 20 is to be captured in response to the notification received by the notification receiving section 64.

The capturing section 74 captures the image rendered in the frame buffer and stores a copy of the image into the captured image storing section 76.

The captured image storing section 76 stores the image captured by the capturing section 74.

In the present embodiment, the notifying section 40, notification receiving section 64, image generating section 70, and capturing section 74 collectively play the role of a capture controlling section. The capture controlling section controls the capture of the image by the capture requesting user in response to the approval or denial of image capture received by the capture approval/denial receiving section 34.

Upon receipt of the denial of the capture of the play image 20, the present embodiment performs control to let a processed play image 20 be captured in which at least part of the information identifying the capture object user is not arranged. In the examples discussed above, the present embodiment allows the image generating section 70 to generate the play image 20 which has the confidential information about the capture object user replaced with the alternative character string AS or which has been partially subjected to mosaic processing.

Figure 16:
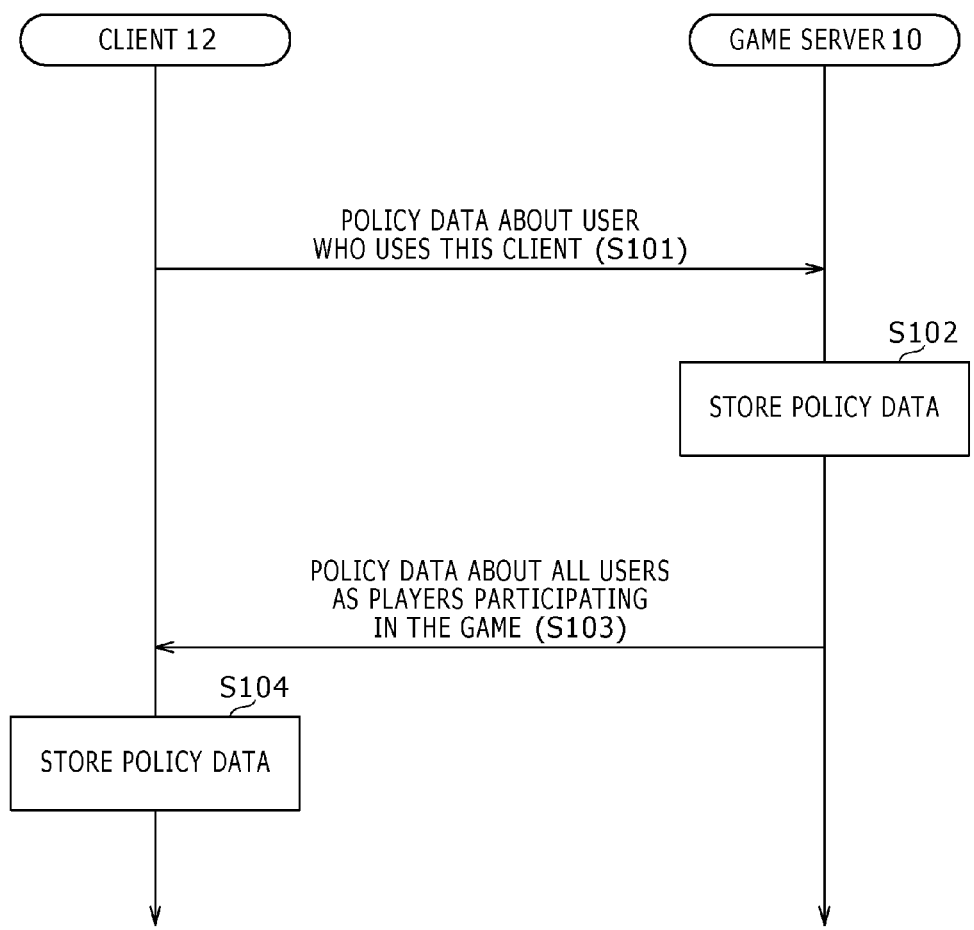
FIG. 16 is a flowchart depicting a typical flow of the process performed by the game system in one embodiment of the present invention.

A typical flow of a policy data sharing process performed by the game system 1 of the present embodiment is described below with reference to the flowchart depicted in FIG. 16.

For the present process, it is assumed that the client-side policy data storing section 50 of each client 12 (12-1 to 12-3) stores the policy data associated with the identification information about the user who uses the client 12, the policy data being set by that user.

The capture approval/denial transmitting and receiving section 56 of the client 12 first transmits to the game server 10 the policy data about the user who uses the client 12. The capture approval/denial receiving section 34 of the game server 10 receives the policy data (S101). Here, the process of S101 is carried out by each of the clients 12-1 to 12-3. The capture approval/denial receiving section 34 of the game server 10 stores the received policy data into the server-side policy data storing section 30 (S102). The policy data depicted in FIG. 5 is thus stored into the server-side policy data storing section 30.

The notifying section 40 transmits to the client 12 the policy data about all users participating as players in the game, i.e., about each of the users as players A, B and C in this example. The capture approval/denial transmitting and receiving section 56 of the client 12 receives the policy data (S103). The capture approval/denial transmitting and receiving section 56 of the client 12 stores the received policy data into the client-side policy data storing section 50 (S104), before terminating this process. In this manner, the policy data depicted in FIG. 5 is also stored into the client-side policy data storing section 50.

In the process of S103 of the present embodiment, the policy data about each of the users as players A, B and C is transmitted to each of the clients 12-1 to 12-3. In the process of S104, the policy data about each of the users as players A, B and C is stored into the client-side policy data storing section 50 of each of the clients 12-1 to 12-3. The above processes are carried out when each client 12 is about to start communicating with the game server 10 or when the game to be played is about to be started.

The user may be allowed to change the setting of the policy data as needed. When a given user has changed the policy data setting, the policy data about that user may be transmitted to the game server 10. In turn, the policy data setting regarding the user and stored in the server-side policy data storing section 30 may be updated to the transmitted policy data setting. The policy data may then be transmitted to each client 12 and stored into the client-side policy data storing section 50 of each client 12. When the policy data setting stored in the client-side policy data storing section 50 is updated, the image generating section 70 may generate the play image 20 in which is arranged an image indicating that the policy data setting has been updated. The display controlling section 72 may display the play image 20 thus generated on the display unit.

In the present embodiment, the server-side policy data storing section 30 may store server-side policy data concerning the approval or denial of capture throughout the game, the server-side policy data being set by the business operator running the game server 10 for example. For instance, the server-side policy data storing section 30 may store the server-side policy data designating blanket denial of the capture of the play image 20.

Between the processes of S102 and S103 above, the capture approval/denial transmitting and receiving section 56 of the game server 10 may update the policy data setting stored in the server-side policy data storing section 30 on the basis of the server-side policy data setting. Specifically, all policy data settings may be updated to "Capture denied." In controlling the capture of the play image 20 this way, the policy in running the game server 10 is made to take precedence over the policy set by any user for example.

It is not necessarily required for the client-side policy data storing section 50 of the client 12 to store beforehand the policy data about the user who uses the client 12. In the process of S101, the capture approval/denial transmitting and receiving section 56 may generate the policy data typically on the basis of user attributes managed by the client 12, before transmitting the policy data. The user attributes may include the user's age, address, the number of times the game has been played by the user, and game playing time of the user.

The policy data may be associated with the programs to be executed. Specifically, the policy data may be associated with game titles and game types for example. The above processes may then be carried out using the policy data identified by the program executed by the game server 10. Also, default policy data may be provided apart from the policy data associated with the program to be executed. In this case, the above processes may be performed using the default policy data if there is no policy data associated with the program to be executed. The policy data may be further associated with the client 12. The capture during a game with no concept of the user's role may then be controlled on the basis of the policy data. As a further alternative, capture control may be performed on the basis of the policy data regardless of which users are playing the game.

The policy data may be stored in the client-side policy data storing section 50 and may be transmitted to the game server 10. The policy data may also be managed by the game server 10 in association with the identification information about each client 12. Capture control may then be performed by the client 12 on the basis of the policy data associated with the identification information about the client 12 subject to capture control.

Figure 17:
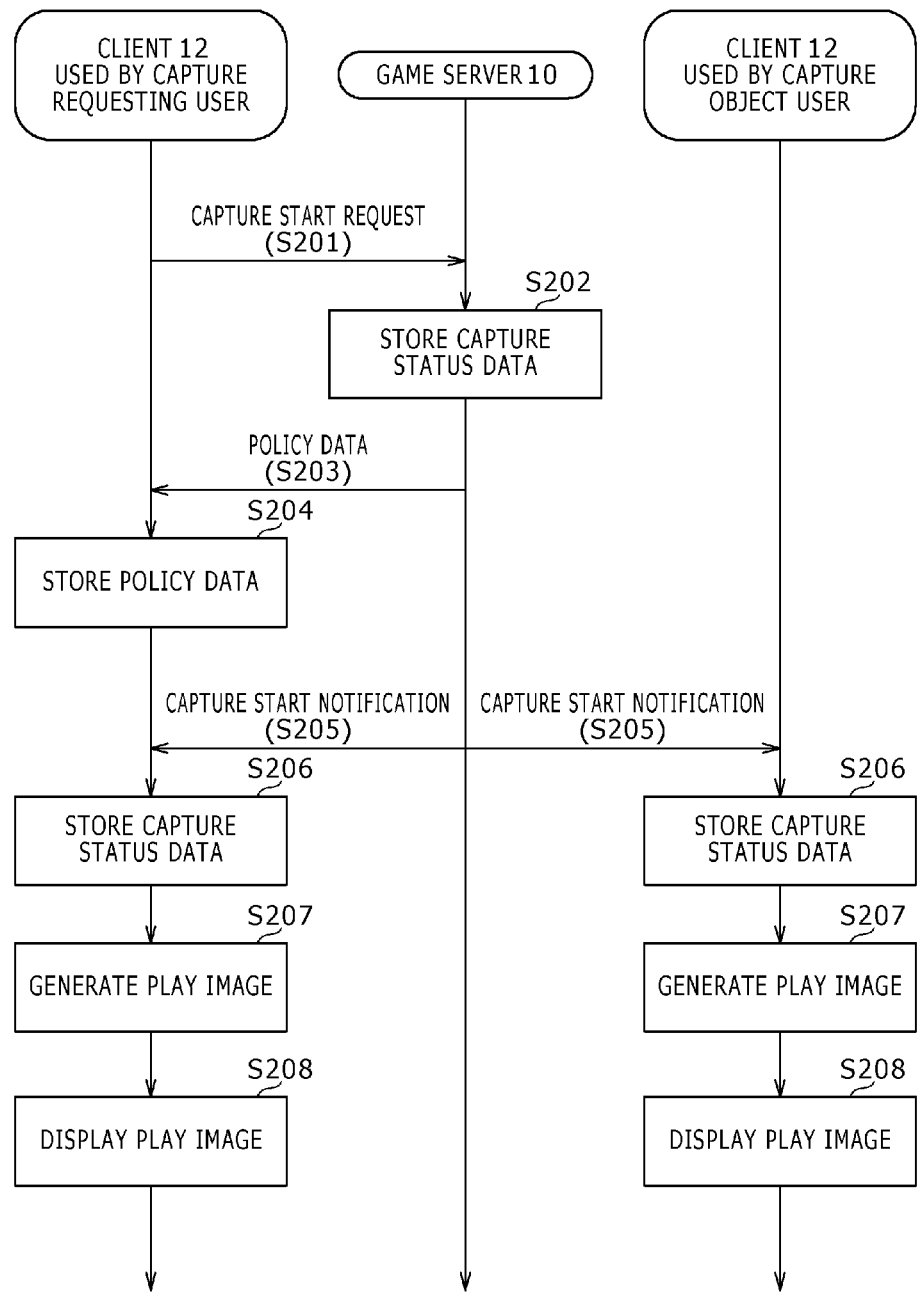
FIG. 17 is another flowchart depicting the typical flow of the process performed by the game system in one embodiment of the present invention.

Explained below with reference to the flowchart depicted in FIG. 17 is a typical flow of the process performed by the game system 1 of the present embodiment when the capture requesting user has performed a play video capture start requesting operation.

The capture requesting section 62 of the client 12 used by the capture requesting user first transmits to the game server 10 a play video capture start request associated with the capture status data about the capture requesting user. The capture request receiving section 38 of the game server 10 receives the capture start request (S201).

The capture request receiving section 38 proceeds to store into the server-side capture status data storing section 32 the capture status data associated with the capture start request received in the process of S201 (S202).

The notifying section 40 transmits the policy data about the capture object user to the client 12 of the capture requesting user. The capture approval/denial transmitting and receiving section 56 of the client 12 of the capture requesting user receives the policy data (S203). The capture approval/denial transmitting and receiving section 56 stores the received policy data into the client-side policy data storing section 50 (S204).

The notifying section 40 transmits to the clients 12 used by the capture object user and by the capture requesting user a play video capture start notification associated with the capture status data about the capture requesting user. The notification receiving section 64 of each client 12 receives the capture start notification (S205). The notification receiving section 64 of each client 12 proceeds to store into the server-side capture status data storing section 32 the capture status data associated with the capture start notification received in the process of S205 (S206). The image generating section 70 of each client 12 then generates the play image 20 (S207). The display controlling section 72 of each client 12 displays the play image 20 on the display unit (S208), before terminating this process. As a result of the processes of S207 and S208, the display unit of the client 12 used by the capture requesting user displays the play image 20 as depicted in FIG. 4. On the other hand, the display unit of the client 12 used by the capture object user displays the play image 20 as depicted in FIG. 6.

Before the process of S201 is carried out, the capture requesting section 62 may determine whether or not there is blanket denial of the capture of play video on the basis of the policy data stored in the client-side policy data storing section 50. If blanket denial is determined to exist, the processes of S201 to S208 may be skipped, the image generating section 70 may generate the play image 20 illustrated in FIG. 13, and the display controlling section 72 may display the generated play image 20.

Following the process of S201 above, the capture request receiving section 38 may transmit a vote request to vote for approval or denial of capture to the client 12 used by the capture object user. The vote request may be transmitted to the client 12 used by a capture object user who denies capture. In this case, a screen prompting voting for approval or denial of capture may be displayed on the display unit of the client 12 that has received the vote request. The capture request receiving section 38 of the game server 10 may then receive the result of the vote input by the capture object user from the client 12 used by the capture object user. The capture request receiving section 38 may then determine either approval or denial of capture reflecting the result of the vote. If capture is determined to be approved, the process of S202 and the subsequent processes above may be performed. If capture is determined to be denied, the game server 10 may skip the process of S202 and the subsequent processes and perform control to display the play image 20 depicted in FIG. 13 on the display unit of the client 12 used by the capture requesting user.

Figure 18:
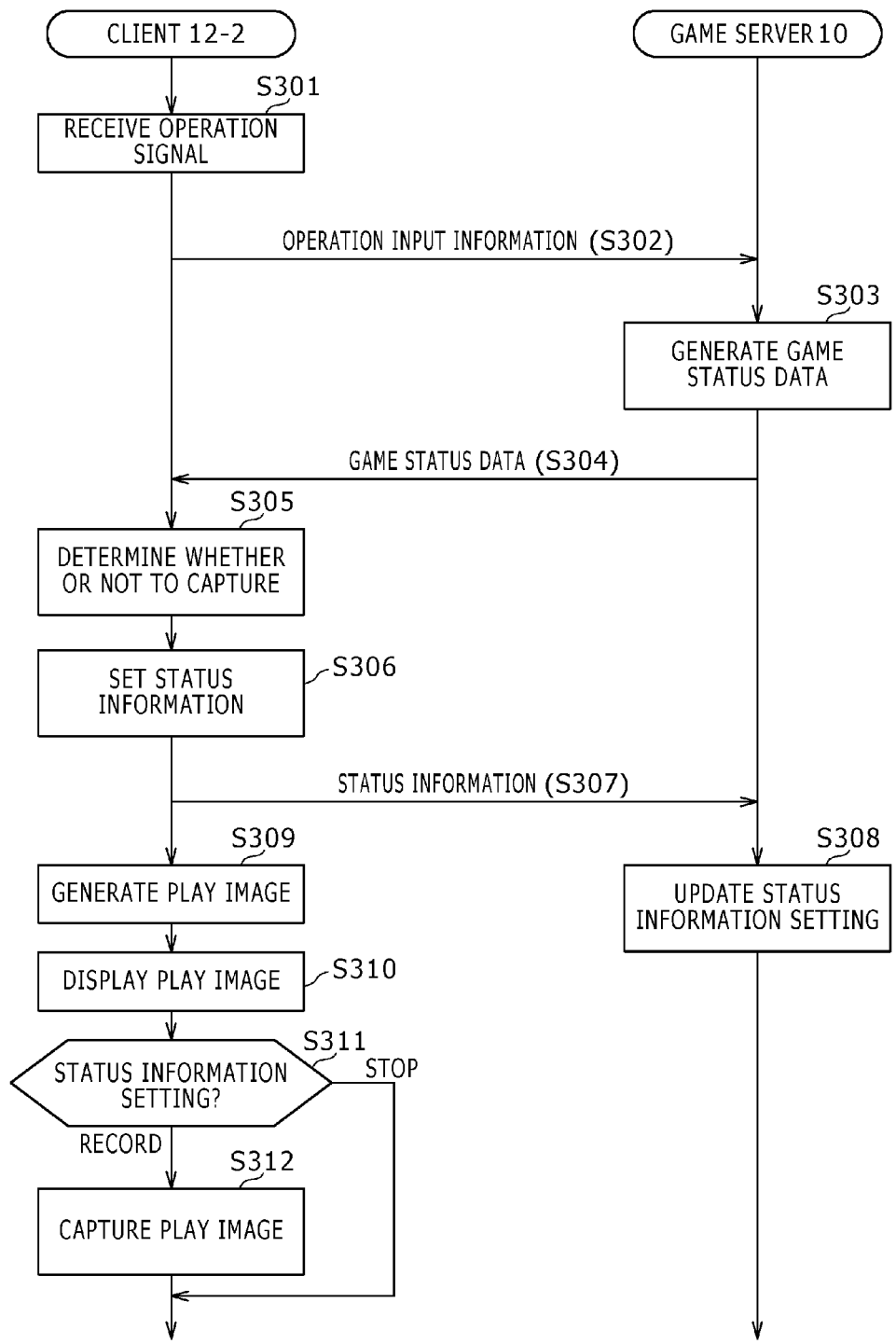
FIG. 18 is another flowchart depicting the typical flow of the process performed by the game system in one embodiment of the present invention.

Explained below with reference to the flowchart depicted in FIG. 18 is a typical flow of the process performed by the client 12-2 and the game server 10 in the present embodiment with regard to one frame in which the game is being played. It is assumed here that the user as player B who uses the client 12-2 is the capture requesting user, for example. It is also assumed that the frame falls in the capture target period for the user as player B.

The operation signal receiving section 54 of the client 12-2 first receives an operation signal in this frame (S301). The game operation input information transmitting section 58 of the client 12-2 transmits to the game server 10 operation input information reflecting the operation signal. The game processing executing section 36 of the game server 10 receives the transmitted operation input information (S302).

The game processing executing section 36 of the game server 10 generates the game status data for the current frame (S303). In the process of S303, the game status data is generated on the basis of the operation input information received from the clients 12 of all users as the players participating in the game and in accordance with the game status data in effect for the preceding frame, for example. The game processing executing section 36 holds the game status data for at least up to the preceding frame.

The game processing executing section 36 of the game server 10 transmits the game status data for the current frame to the client 12-2. The game status data receiving section 60 of the client 12-2 receives the game status data (S304). In the process of S304, the game status data is actually transmitted to the clients 12 of all users that are the players participating in the game, including the capture requesting user.

The capture requesting section 62 of the client 12-2 determines whether or not to capture the play image 20 in the current frame on the basis of the game status data received in the process of S304 and in accordance with the capture conditions regarding the user as player B (S305). The capture conditions may be included in the capture status data about the user as player B, the capture status data being stored in the client-side capture status data storing section 52 of the client 12-2, for example.

On the basis of the result of the determination in the process of S305, the capture requesting section 62 of the client 12-2 sets the status information associated with the capture status data about the user as player B (S306). In this case, the status information about the user as player B is associated with the capture status data about the user as player B, the capture status data being stored in the client-side capture status data storing section 52 of the client 12-2, for example. The status information in this example is set to be either "Stop" or "Record." The capture requesting section 62 of the client 12-2 transmits to the game server 10 the status information set in the process of S306 in association with the identification information about the capture requesting user. The capture request receiving section 38 of the game server 10 receives the status information (S307). The capture request receiving section 38 of the game server 10 updates the setting of the status information about the user as player B to the status information setting received in the process of S307 (S308). In this case, the status information about the user as player B is associated with the capture status data about the user as player B, the capture status data being stored in the server-side capture status data storing section 32 for example.

The image generating section 70 of the client 12-2 then generates the play image 20 (S309). The generated play image 20 is rendered in the frame buffer.

In the process of S309, the image generating section 70 of the client 12-2 first generates a basic play image 20 on the basis of the game status data received in the process of S304.

The image generating section 70 of the client 12-2 then arranges the above-described images I1a, I1b, I2 to I4, and I7 in the play image 20 in accordance with the capture status data stored in the client-side capture status data storing section 52.

At this point, the image generating section 70 identifies the identification information about the players whose capture status data is stored in the client-side capture status data storing section 52, for example. From among these players, the image generating section 70 identifies the players who deny capture and those who approve capture on the basis of the policy data stored in the client-side policy data storing section 50. The image generating section 70 proceeds to arrange the image I1b at the position corresponding to the identification information about the player identified as a player who denies capture (see FIGS. 6 and 12, among others).

With regard to each player identified as a player who approves capture, the image generating section 70 determines whether or not the player meets the capture conditions. Whether or not the player meets the capture conditions may be identified on the basis of the status information setting associated with the capture status data stored in the client-side capture status data storing section 52. The image generating section 70 arranges the image I1a at the position corresponding to the identification information about the player who meets the capture conditions. The image generating section 70 further arranges the image I1c at the position corresponding to the identification information about the player who fails to meet the capture conditions (see FIG. 12).

The image generating section 70 of the client 12-2 deletes from the play image 20 the confidential information about the users who deny the capture of the play image 20 in accordance with the policy data stored in the client-side policy data storing section 50. For example, the image generating section 70 of the client 12-2 may replace the confidential information with the alternative character string AS or perform mosaic processing on that part of the play image 20 which includes the confidential information.

The display controlling section 72 of the client 12-2 displays on the display unit the play image 20 generated in the process of S309 (S310).

The capturing section 74 determines whether the status information is set to be "Record" or "Stop," the status information being stored in the client-side capture status data storing section 52 and associated with the capture status data about the user as player B (S311). If the status information is set to be "Stop," this process is terminated. If the status information is set to be "Record," the capturing section 74 captures the play image 20 rendered in the frame buffer, stores the captured play image 20 into the captured image storing section 76 of the client 12-2 (S312), and terminates this process.

Alternatively in the process of S309, the image generating section 70 may determine whether or not any character object CO is arranged in the play image 20 to be captured. The image generating section 70 may then delete from the play image 20 the confidential information about the user whose character object CO is determined to be arranged. The determination may be made by performing raycasting from the position of the viewpoint corresponding to the capture requesting user onto the position of the character object CO of the capture object user, to see whether or not there is any obstacle between the two positions. Alternatively, if the distance between these two positions is found shorter than a predetermined length, a character object CO may be determined to be arranged in the play image 20 to be captured. The determination may be made solely on the frames meeting the capture conditions regarding the capture requesting user.

Figure 19:
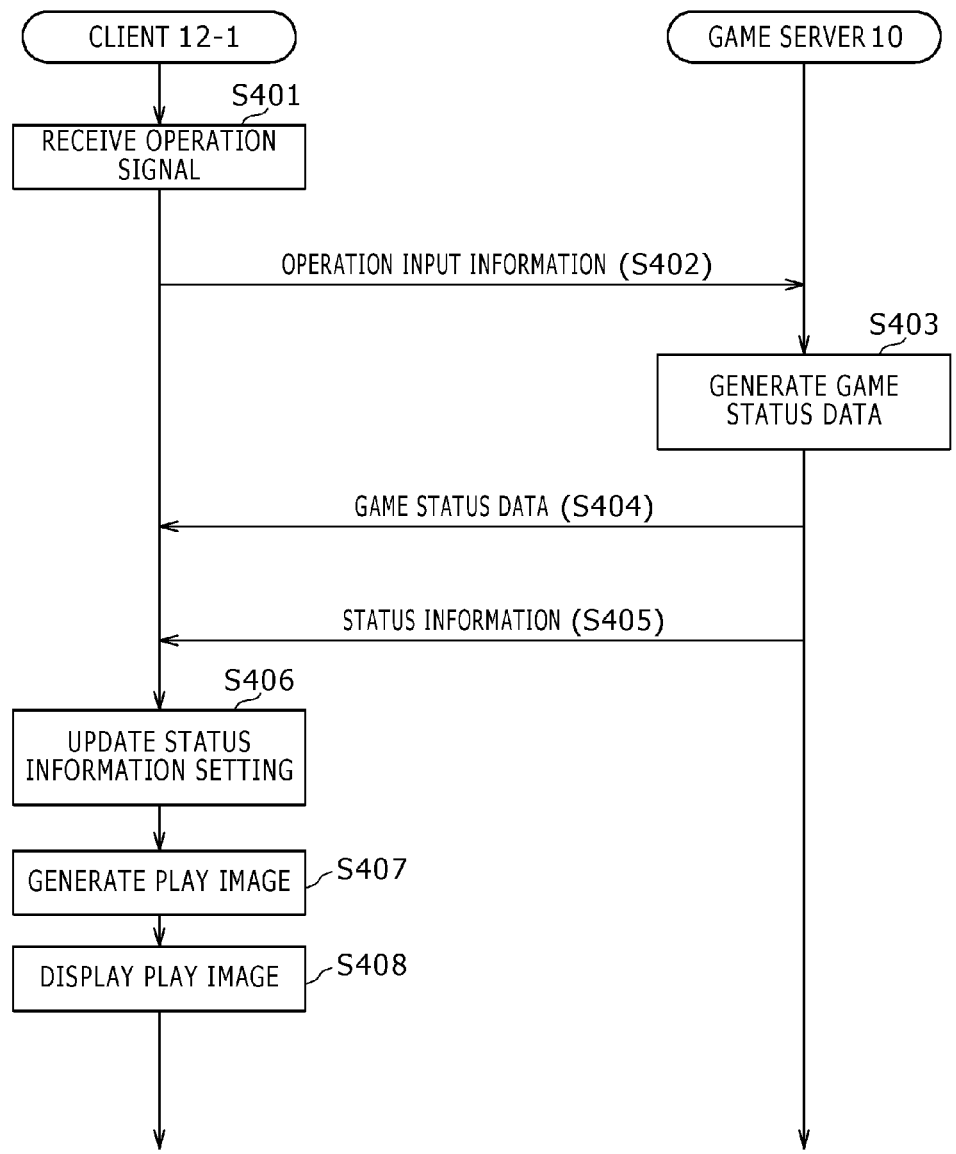
FIG. 19 is another flowchart depicting the typical flow of the process performed by the game system in one embodiment of the present invention.

Explained below with reference to the flowchart depicted in FIG. 19 is a typical flow of the process performed by the client 12-1 and the game server 10 in the present embodiment with regard to one frame in which the processes S301 to S312 above are shown as described above while the game is being played. For this frame, it is assumed that the user as player B is the capture requesting user as described above. It is also assumed that the user as player A who uses the client 12-1 is the capture object user, for example.

The client 12-1 first performs processes equivalent to processes of S301 to S304 discussed above (S401 to S404).

The notification receiving section 64 of the client 12-1 receives the status information transmitted from the game server 10 (S405). The process in which the game server 10 transmits the status information takes place typically after the process of S308 above. The status information was transmitted earlier from the client 12-2 in the process of S307 above, for example. The notification receiving section 64 of the client 12-1 updates the setting of the status information about the user as player B to the status information setting received in the process of S405 (S406). In this case, the status information about the user as player B is associated with the capture status data about the user as player B, the capture status data being stored in the client-side capture status data storing section 52 of the client 12-1, for example.

The client 12-1 then performs processes equivalent to processes S309 and S310 above (S407, S408), before terminating this process. In these processes, the image I1a, I1b, or I1c is arranged at the position in the play image 20 corresponding to the identification information about the user as player B.

Alternatively in the process of S407, as in the process of S309 above, the image generating section 70 may determine whether or not any character object COa is arranged in the play image 20-2 to be captured by the capture requesting user. In accordance with the result of the determination, the image generating section 70 may perform control whether or not to arrange in the play image 20 the image I4 depicted in FIG. 8.

Figure 20:
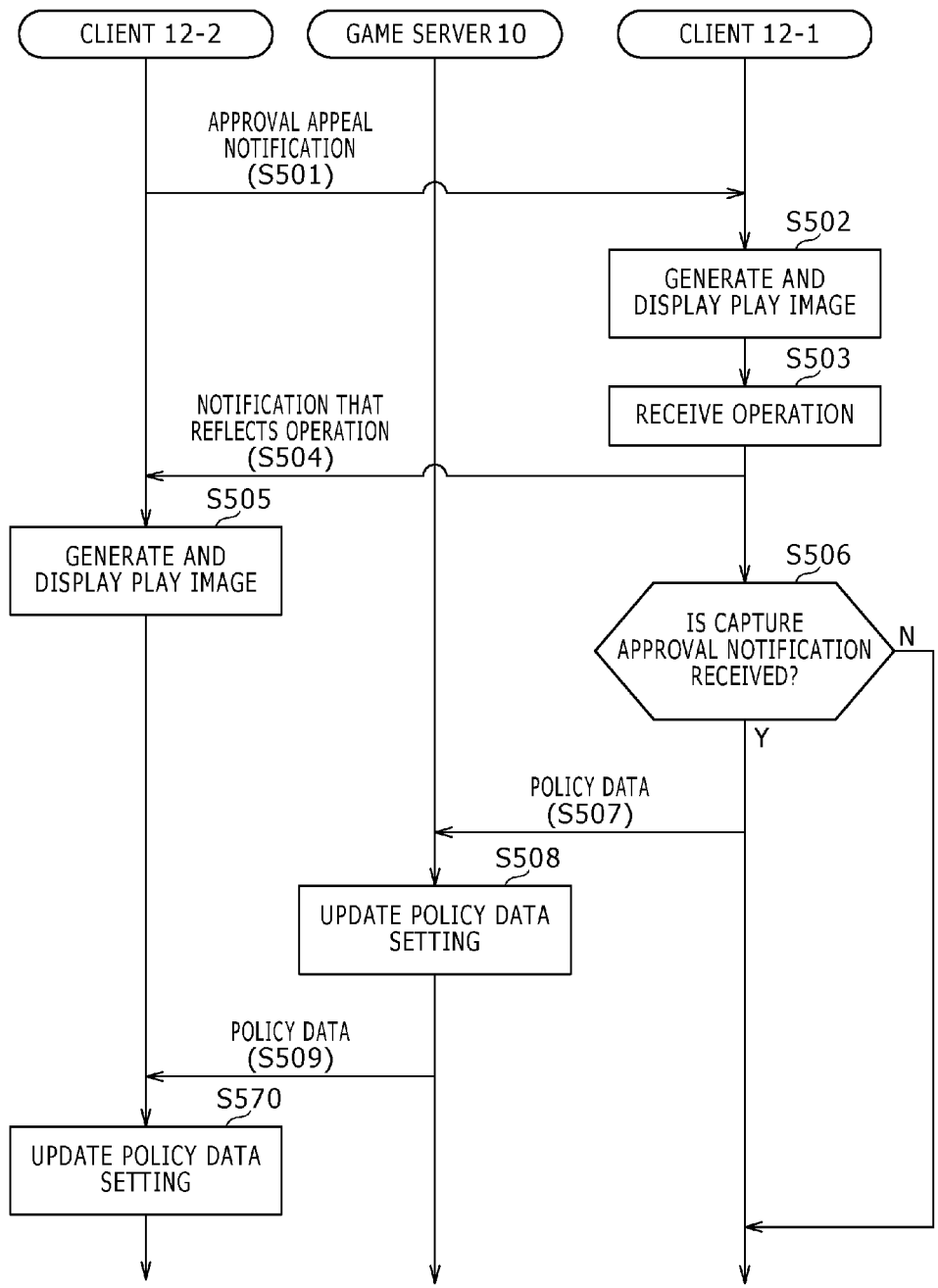
FIG. 20 is another flowchart depicting the typical flow of the process performed by the game system in one embodiment of the present invention.

Explained next with reference to the flowchart depicted in FIG. 20 is a typical flow of the process performed by the game system 1 when the user as player B has performed the operation to appeal approval from the user as player A.

The capture appealing section 66 of the client 12-2 first transmits an approval appeal notification to the client 12-1. The capture appeal handling section 68 of the client 12-1 receives the approval appeal notification (S501). The image generating section 70 of the client 12-1 then generates the play image 20-1 in which the image I5 is arranged as depicted in FIG. 9. The display controlling section 72 of the client 12-1 displays the generated play image 20-1 on the display unit of the client 12-1 (S502).

At this point, the operation signal receiving section 54 of the client 12-1 receives either a capture approving operation or a capture denying operation (S503). The capture appeal handling section 68 of the client 12-1 transmits to the client 12-2 a notification reflecting the operation received in the process of S503 by the operation signal receiving section 54 of the client 12-1. The capture appealing section 66 of the client 12-2 receives the notification (S504). If the capture denying operation is received in the process of S503, a notification that denies capture is transmitted in the process of S504. If the capture approving operation is received in the process of S503, a notification that approves capture is transmitted in the process of S504.

The image generating section 70 of the client 12-2 then generates the play image 20-2 reflecting the notification received in the process of S504. The display controlling section 72 of the client 12-2 displays the generated play image 20-2 on the display unit (S505). If the notification that denies capture is received for example, the play image 20-2 in which the image 16 is arranged is displayed as depicted in FIG. 10. On the other hand, if the notification that approves capture is received, what is displayed here is the play image 20-2 in which an image indicating the approval of capture by player B is arranged.

The capture approval/denial transmitting and receiving section 56 of the client 12-1 confirms whether or not the capture approving operation was received in the process of S503 (S506). If it is confirmed that the capture approving operation was not received, i.e., that the capture denying operation was received instead (S506: N), the game system 1 terminates this process. If it is confirmed that the capture approving operation was received (S506: Y), the capture approval/denial transmitting and receiving section 56 of the client 12-1 transmits to the game server 10 the policy data about the user as player A, the policy data being set to be "Capture approved for the user as player B and for a friend." The capture approval/denial receiving section 34 of the game server 10 receives the policy data (S507).

The capture approval/denial receiving section 34 of the game server 10 proceeds to update the setting of the policy data about the user as player A to the policy data setting received in the process of S507, the policy data about the user as player A being stored in the server-side policy data storing section 30 (S508). The notifying section 40 of the game server 10 transmits the updated policy data to the clients 12 used by the users participating in the game as its players. In this case, the updated policy data is transmitted to the clients 12-1 to 12-3 for example. That means the updated policy data is also transmitted to the client 12-2. The capture approval/denial transmitting and receiving section 56 of the client 12-2 receives the transmitted policy data (S509).

The capture approval/denial transmitting and receiving section 56 of the client 12-2 updates the setting of the policy data about the user as player A to the policy data setting received in the process of S509, the policy data about the user as player A being stored in the client-side policy data storing section 50 (S510). This is how the capture of the confidential information about the user as player A is approved for the user as player B. As a result, the display unit of the client 12-2 displays the play image 20-2 depicted in FIG. 7, and the display unit of the client 12-1 displays the play image 20-2 depicted in FIG. 8. This process is then brought to an end. In this manner, the embodiment controls the capture of the play image 20 by the capture requesting user in accordance with the approval or denial concerning the capture of the play image 20 and received from the capture object user who has received the approval appeal notification.

The present invention is not limited to the embodiment discussed above.

For example, all functions depicted in FIG. 15 may be implemented as the game program. All of these functions in FIG. 15 may also be implemented as the system program. Some of the functions depicted in FIG. 15 may be implemented as the game program and the remaining functions as the system program. Specifically, the system program may receive the play video capture start notification or the play video capture end notification as discussed above in connection with the notification receiving section 64. The game program may overwrite the play image 20 with the image I1a, image I1b, and images 12 to 18 as explained above in connection with the image generating section 70. The game program may then display on the display unit the image generated by the image generating section 70 as described above in connection with the display controlling section 72.

Figure 21:
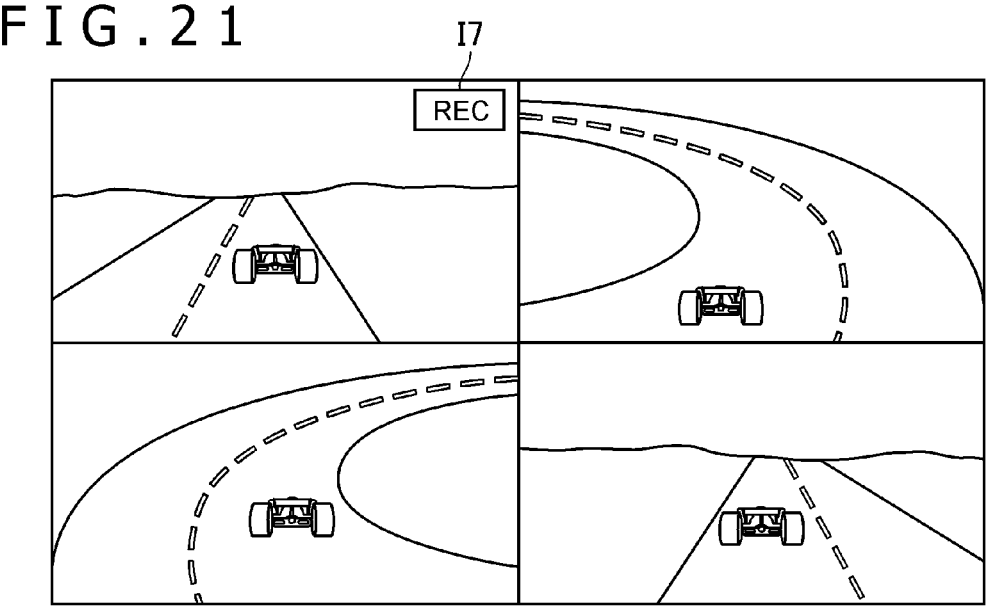
FIG. 21 is a schematic diagram depicting another typical play image.

As another example, the above embodiment may be adapted to a game played by a plurality of players on a single game console. FIG. 21 depicts a typical play image 20 appearing on the display unit when such a game is being played. The play image 20 depicted in FIG. 21 is that of a game played by four players. This play image 20 is divided into a top left area, a bottom left area, a top right area, and a bottom right area. Each of the areas shows the play content of one of the four different players. Suppose now that the user as the player associated with the top left area is capturing the play video. In this case, the play image 20 with its top left area cut out is captured. As depicted in FIG. 21, the image I7 is arranged in the top left area of the play image 20. This allows the other players to recognize that the play image 20 is being captured.

At this point, the image I7 arranged in the top left area of the play image 20 may be either supplemented or replaced with a changing manner in which a light-emitting section of the controller operated by the player associated with the top left area is illuminated. For example, the light-emitting section of the controller operated by the player associated with the top left area may be caused to light differently from the light-emitting sections of the controllers operated by the other players. This will notify the capture object users that the play image 20 is being captured. Specifically, the light-emitting section of the controller operated by the player associated with the top left area may be caused to repeat rapid blinking or repeat slow flickering. Alternatively, the color of the light emitted by the light-emitting section of the controller may be caused to change periodically.

Figure 22:
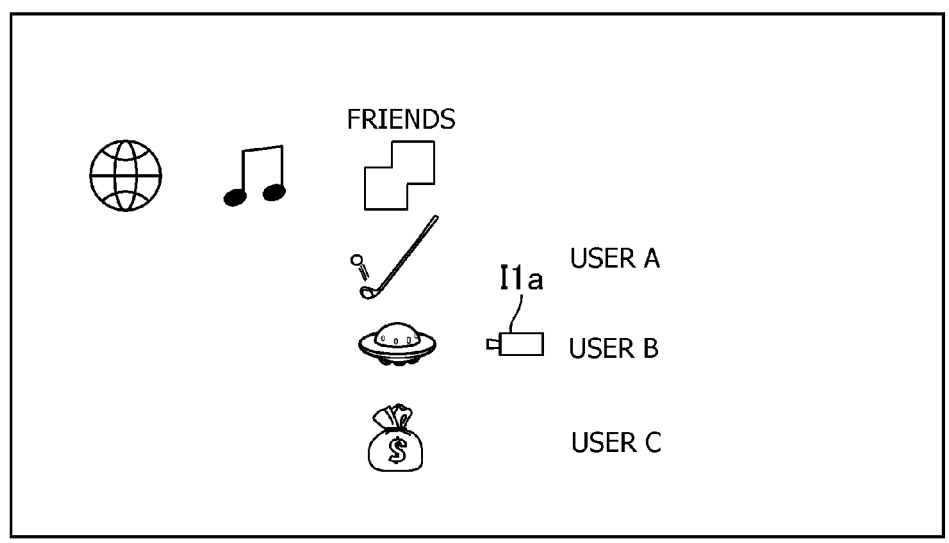
FIG. 22 is a schematic diagram depicting a typical system image.

As another example, the capture start notification may be transmitted not to the players of the game but to the client 12 used by the user as a friend of the capture requesting user. The capture status data may then be stored into a storage region managed by the system program. In this case, as depicted in FIG. 22, the image I1a may be arranged on the right of an icon indicative of the capture requesting user in the system image generated and displayed by the system program.

In another example, as depicted in FIG. 23, a list display screen listing the game servers 10 to which the user can log in and displayed through the server browser may be caused to show an image associated with the capture control policies regarding the play image 20 of the game to be played with each of the listed game servers 10. Arranged on the list display screen listing the game servers 10 in FIG. 23 are fractions associated with the identification information about the game servers 10, each fraction being composed of a denominator representing the maximum number of the players that can participate in the game played with the corresponding game server 10 and a numerator denoting the number of the players currently participating in the game. In the example of FIG. 23, icons Ic1 are arranged on the right of the identification information about the game servers 10 performing control to impose blanket denial of the capture of the play image 20. Also in the example of FIG. 23, icons Ic2 are arranged on the right of the identification information about the game servers 10 performing control to provide blanket approval of the capture of the play image 20. Further in the example of FIG. 23, an icon Ic3 is arranged on the right of the identification information about the game server 10 performing control to provide blanket approval, for friends, of the capture of the play image 20. No icon is arranged on the right of the identification information about the game server 10 not exercising blanket control over the capture of the play image, i.e., about the game server 10 to which is applied the policy data set by the clients 12.

When the user performs an operation to select one of the game servers 10, the client 12 logs in to the selected game server 10. At this point, an image such as the icon associated with the capture control policy applicable to the selected game server 10 may be arranged on the screen displayed on the display unit while the client 12 is being connected to the game server 10 or while the client 12 is loading the game run by that game server 10. For example, the icon Ic1 may be arranged on the screen displayed on the display unit while the client 12 is being connected to the game server 10 performing control to impose blanket denial of the capture of the play image 20 or while the client 12 is loading the game run by that game server 10. As another example, the icon Ic2 may be arranged on the screen displayed on the display unit while the client 12 is being connected to the game server 10 performing control to provide blanket approval of the capture of the play image 20 or while the client 12 is loading the game run by that game server 10. As a further example, the icon Ic3 may be arranged on the screen displayed on the display unit while the client 12 is being connected to the game server 10 performing control to provide blanket approval, for friends, of the capture of the play image 20 or while the client 12 is loading the game run by that game server 10.

As another example, where the play image 20 is being streamed in real time, the players of the game may be notified that the streamed play image 20 is to be captured by a watcher of the play image 20. That is, the capture requesting user may not be a user as a player of the game, and the capture object user may be a user as a player of the game.

The captured play video may be streamed live. For example, the captured play video may not be stored into the storage section 12b of the client 12. Instead, the captured play video may be buffered before being uploaded to and published by a website that offers the live streaming service.

The above embodiment may be adapted to programs other than the game program, such as programs for supporting collaborative work to be performed by a plurality of users. Specifically, the embodiment may be adapted to a chat application or an electronic bulletin board, for example. The game server 10 may be constituted by a plurality of enclosures. The roles to be played by the game server 10 and clients 12 are not limited to those discussed above. For example, one of the clients 12 as a device may play the role of the game server 10 as well. Such a device will play the role of both the game server 10 and that of the client 12. In the foregoing description and in the accompanying drawings, specific character strings are only examples and are not limitative of the present invention.

The invention claimed is:

1. A capture notification system comprising:
    a capture request receiving section configured to receive a capture request of an image indicating content of execution of a program from a capture requesting user requesting capture of the image; and
    a notifying section configured, when a capture object user who is not the capture requesting user has denied approval to the capture object user's image being included in the image, to notify the capture object user that the image is to be captured in response to the receipt of the capture request.

2. The capture notification system according to claim 1, wherein the program is a program of a game to be participated in by a plurality of users including the capture requesting user and the capture object user.

3. The capture notification system according to claim 1, wherein the notifying section notifies the capture object user of identification information about the capture requesting user, thereby notifying the capture object user that the image is to be captured by the capture requesting user.

4. The capture notification system according to claim 1, further comprising a display controlling section configured to cause a display section used by the capture object user to be notified of the capture of the image to indicate that the image is to be captured.

5. The capture notification system according to claim 4, wherein the display controlling section causes a specific position on the display section which corresponds to the capture requesting user to indicate that the image is to be captured.

6. The capture notification system according to claim 1, wherein the notifying section changes the manner in which a light-emitting section of a controller operated by the capture requesting user is illuminated, thereby notifying the capture object user that the image is to be captured.

7. A capture notification method comprising:
    receiving a capture request of an image indicating content of execution of a program from a capture requesting user requesting capture of the image; and
    when a capture object user who is not the capture requesting user has denied approval to the capture object user's image being included in the image, notifying the capture object user that the image is to be captured in response to the receipt of the capture request.

8. A non-transitory computer-readable information storage medium on which a program is recorded, the program when executed by a computer causing the computer to carry out actions, comprising:
    receiving a capture request of an image indicating content of execution of a program from a capture requesting user requesting capture of the image; and
    notifying, when a capture object user who is not the capture requesting user has denied approval to the capture object user's image being included in the image, the capture object user that the image is to be captured in response to the receipt of the capture request.

9. An information processing device comprising a capture requesting section configured, when a capture object user who is not the capture requesting user has denied approval to the capture object user's image being included in an image indicating content of execution of a program by a capture requesting user requesting capture of the image, to notify the capture object user that the image is to be captured in response to the requesting.

10. A non-transitory computer-readable information storage medium on which a program is recorded, the program when executed by a computer causing the computer to carry out actions, comprising: step 1, by a capture requesting section, notifying, when a capture object user who is not the capture requesting user has denied approval to the capture object user's image being included in an image indicating content of execution of a program by a capture requesting user requesting capture of the image, the capture object user that the image is to be captured in response to the requesting.

11. An information processing device comprising:
    a notification receiving section configured to receive a notification that a capture requesting user requesting capture of an image indicating content of execution of a program is to capture the image; and
    a notifying section configured, when a capture object user who is not the capture requesting user has denied approval to the capture object user's image being included in the image, to notify the capture object user that the image is to be captured in response to the receipt of the notification.

12. A non-transitory computer-readable information storage medium on which a program is recorded, the program when executed by a computer causing the computer to carry out actions, comprising:

receiving a notification that a capture requesting user requesting capture of an image indicating content of execution of a program is to capture the image; and notifying, when a capture object user who is not the capture requesting user has denied approval to the capture object user's image being included in the image, the capture object user that the image is to be captured in response to the receipt of the notification.

* * * * *